United States Patent
Park

(10) Patent No.: US 11,758,546 B2
(45) Date of Patent: Sep. 12, 2023

(54) METHOD AND APPARATUS FOR DETERMINING HARQ TIMING IN WIRELESS COMMUNICATIONS

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 232 days.

(21) Appl. No.: 16/986,949

(22) Filed: Aug. 6, 2020

(65) Prior Publication Data
US 2021/0045100 A1 Feb. 11, 2021

(30) Foreign Application Priority Data
Aug. 6, 2019 (KR) .................. 10-2019-0095768

(51) Int. Cl.
*H04L 1/1812* (2023.01)
*H04W 72/23* (2023.01)
*H04W 72/21* (2023.01)

(52) U.S. Cl.
CPC .......... *H04W 72/23* (2023.01); *H04L 1/1812* (2013.01); *H04W 72/21* (2023.01)

(58) Field of Classification Search
CPC combination set(s) only.
See application file for complete search history.

(56) References Cited

U.S. PATENT DOCUMENTS

| | | | |
|---|---|---|---|
| 11,356,979 B2* | 6/2022 | He | H04W 4/46 |
| 2019/0098656 A1 | 3/2019 | Chendamarai et al. | |
| 2020/0228247 A1* | 7/2020 | Guo | H04W 52/383 |
| 2020/0336253 A1* | 10/2020 | He | H04W 4/40 |
| 2020/0396040 A1* | 12/2020 | Miao | H04W 4/40 |
| 2021/0127383 A1* | 4/2021 | Hui | H04L 1/1812 |
| 2021/0250136 A1* | 8/2021 | Ye | H04L 1/1864 |

OTHER PUBLICATIONS

"3rd Generation Partnership Project; Technical Specification Group Radio Access Network; NR; Multiplexing and channel coding (Release 15)", 3GPP TS 38.212 V15.6 0, Jun. 2019, pp. 1-101, 3GPP Organizational Partners.

(Continued)

*Primary Examiner* — Hanh N Nguyen

(57) ABSTRACT

Sidelink downlink control information may include a first indicator field that indicates a sidelink hybrid automatic repeat request (HARQ) feedback timing. A bitwidth of the first indicator field may be based on at least one of one or more parameters from the base station. The first wireless user device may transmit, based on the SL DCI and to a second wireless user device, a first sidelink signal. The first wireless user device may receive, during a first time interval and from the second wireless user device, first sidelink HARQ feedback information responsive to the first sidelink signal. The first wireless user device may determine, based on the sidelink HARQ feedback timing and based on the first time interval, a second time interval. The first wireless user device may transmit, during the second time interval and to the base station, the first sidelink HARQ feedback information.

19 Claims, 18 Drawing Sheets

(56) References Cited

OTHER PUBLICATIONS

"3rd Generation Partnership Project; Technical Specification Group Radio Access Network; NR; Physical layer procedures for control (Release 15)", 3GPP TS 38.213 V15.6 0, Jun. 2019, pp. 1-107, 3GPP Organizational Partners.

"3rd Generation Partnership Project; Technical Specification Group Radio Access Network; NR; Radio Resource Control (RRC) protocol specification (Release 15)", 3GPP TS 38.331 V15.6.0, Jun. 2019, pp. 1-519, 3GPP Organizational Partners.

International Search Report for International Patent Application No. PCT/KR2020/010363, dated Nov. 13, 2020.

Written Opinion of The international Searching Authority for International Patent Application No. PCT/KR2020/010363, dated Nov. 13, 2020.

Fujitsu, "Discussion on HARQ-ACK feedback for NR-V2X", R1-1901944, 3GPP TSG RAN WG1 #96, Athens, Greece, Feb. 15, 2019, pp. 1-3 and Figure 1b.

CMCC, "Discussion on HARQ feedback", R1-1900405, 3GPP TSG RAN WG1 Ad-Hoc Meeting 1901, Taipei, Taiwan, Jan. 12, 2019, pp. 1-4 and figure 1.

Huawei et al., "Sidelink physical layer procedures for NR V2X", R1-1906008, 3GPP TSG RAN WG1 Meeting #97, Reno, USA, May 3, 2019, pp. 1-4 and figure 2.

NTT DoCoMo, Inc., "NR Sidelink Resource Allocation Mechanism Mode 1", R1-1906206, 3GPP TSG RAN WG1 #97, Reno, USA, May 3, 2019, pp. 1-3.

3GPP TSG HAN WG1 Meeting #97 R1-1906315 Reno, USA, May 13-17, 2019. Source: CATT Title: On Mode 1 resource allocation in NR V2X Agenda Item: 7.2.4.2.1 Document for: Discussion and Decision.

3GPP TSG RAN WG1 #97 R1-1906211 Reno, US, May 13-17, 2019. Source: N1T Docomo, Inc. Title: PDCCH enhancements for URLLC Agenda Item: 7.2.6.1 Document for: Discussion and Decision.

3GPP TSG HAN WG1 Meeting #97 R1-1 906565 Reno, USA, May 13-17, 2019 Agenda Item: 7.2.6.1 Source: MediaTek Inc. Title: PDCCH enhancements for eURLLC Document for: Discussion and Decision.

3GPP TSG RAN WG1 #97 R1-1906956 Reno, USA, May 13-17, 2019 Agenda item: 7.2.6.2 Source: Samsung Title: UL Control for URLLC Document for: Discussion and Decision.

3GPP TSG HAN WG1 Meeting #97 R1-1 906321 Reno, USA, May 13-17, 2019 Source: CATI Title: On NR Uu controlling LTE sidelink Agenda Item: 7.2.4.7 Document for: Discussion and Decision.

3GPP TSG RAN WG1 #97 R1-1 906283 Reno, USA, May 13-17, 2019 Agenda Item: 7.2.2.2.3 Source: Lenovo, Motorola Mobility Title: HARQ enhancement for NR-U Document for: Discussion & Decision.

The European Extended Search Report from European Patent Office dated Jul. 6, 2023, Application No. 20849320.5.

* cited by examiner

METHOD AND APPARATUS FOR DETERMINING HARQ TIMING IN WIRELESS COMMUNICATIONS

CROSS-REFERENCE TO RELATED APPLICATION

This application claims priority from and the benefit of Korean Patent Application No. 10-2019-0095768 filed on Aug. 6, 2019, which is hereby incorporated by reference in its entirety.

BACKGROUND

1. Field

The present disclosure may provide a method and apparatus for wireless communications. One or more devices may determine a Hybrid Automatic Repeat Request (HARQ) timing in wireless communications, such as new radio (NR) vehicle-to-everything (V2X) communications and any other wireless communications.

2. Discussion of the Background

International Mobile Telecommunication (IMT) framework and standard have been developed by the International Telecommunication Union (ITU). Also, continuous discussion for 5-th generation (5G) communication is ongoing through a program called "IMT for 2020 and beyond".

To satisfy the requirements requested by "IMT for 2020 and beyond", various proposals have been made to support various numerologies about a time-frequency resource unit standard by considering various scenarios, service requirements, and potential system compatibility in a 3-rd Generation Partnership Project (3GPP) new radio (NR) system.

Vehicle-to-everything (V2X) communication may include a communication method of exchanging or sharing road infrastructures during driving and information, such as traffic conditions, through communication with other vehicles. V2X may include, for example, vehicle-to-vehicle (V2V), which may refer to long term evolution (LTE)-based communication between vehicles, vehicle-to-pedestrian (V2P), which may refer to LTE-based communication between a vehicle and a user equipment (UE) carried by a user, and vehicle-to-infrastructure/network (V2I/N), which may refer to LTE-based communication between a vehicle and a roadside unit (RSU)/network. The RSU may be a transportation infrastructure entity configured by a base station or a fixed terminal, such as, an entity that transmits a speed notification to a vehicle.

Low latency and high reliability may need to be secured for V2X communication services. To secure low latency and high reliability in V2X communication services, various examples including determining a HARQ feedback transmission timing in the case of transmitting HARQ feedback information in V2X communication will be described herein.

SUMMARY

Sidelink downlink control information may include a first indicator field that indicates a sidelink hybrid automatic repeat request (HARQ) feedback timing. A bitwidth of the first indicator field may be based on at least one of one or more parameters from the base station. The first wireless user device may transmit, based on the SL DCI and to a second wireless user device, a first sidelink signal. The first wireless user device may receive, during a first time interval and from the second wireless user device, first sidelink HARQ feedback information responsive to the first sidelink signal. The first wireless user device may determine, based on the sidelink HARQ feedback timing and based on the first time interval, a second time interval. The first wireless user device may transmit, during the second time interval and to the base station, the first sidelink HARQ feedback information.

An aspect of the present disclosure may provide a method and apparatus for determining a Hybrid Automatic Repeat Request (HARQ) timing in vehicle-to-everything (V2X) communication.

An aspect of the present disclosure may provide a method and apparatus that allows a user equipment (UE) to report sidelink HARQ feedback to a base station in V2X communication.

An aspect of the present disclosure may provide a method and apparatus for determining a Uu HARQ feedback timing used for a UE to report sidelink HARQ feedback to a base station.

A method may include transmitting, by a transmitting UE (Tx UE), Hybrid Automatic Repeat Request (HARQ) feedback information in a new radio (NR) V2X system. Here, the HARQ feedback information transmission method may include configuring an A/N window through Radio Resource Control (RRC) signaling from a base station, receiving sidelink (SL) DCI from the base station, transmitting data to a receiving UE (Rx UE) through a sidelink based on the SL DCI, receiving sidelink HARQ feedback information about the data from the Rx UE, and reporting to the base station for the sidelink HARQ feedback information received from the Rx UE. Here, the sidelink HARQ feedback information may be transmitted to the base station in an indicated uplink slot based on SL DCI within the A/N window.

According to the present disclosure, since a Tx UE transmits, to a base station, HARQ feedback information received from an Rx UE in V2X communication, it may assist a base station to determine a V2X communication resource.

DETAILED DESCRIPTION OF THE ILLUSTRATED EMBODIMENTS

Figure 1:
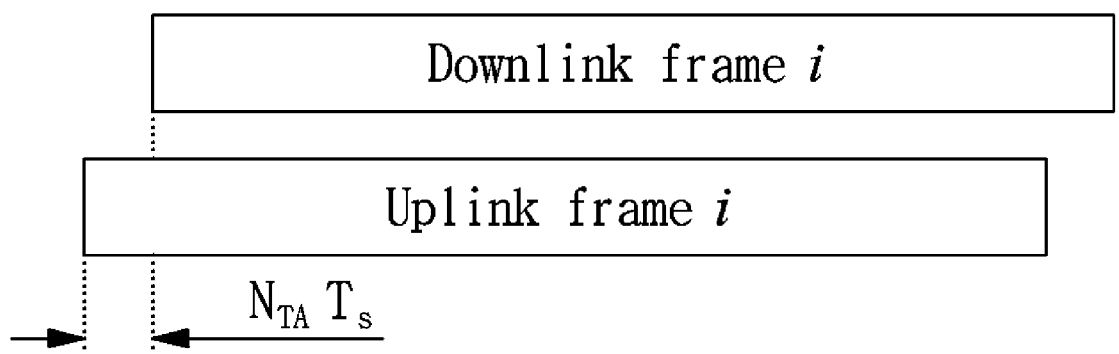
FIG. 1 illustrates an example of a frame structure for downlink/uplink transmission.

Various embodiments of the disclosure will be described more fully hereinafter with reference to the accompanying drawings such that one of ordinary skill in the art to which the present disclosure pertains may easily implement the embodiments. However, the present disclosure may be implemented in various forms and is not limited to the embodiments described herein.

In describing the embodiments, detailed description on known configurations or functions may be omitted for clarity and conciseness. Throughout the drawings and the detailed description, unless otherwise described, the same drawing reference numerals are understood to refer to the same elements, features, and structures.

It will be understood that when an element is referred to as being "connected to", "coupled to", or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element uncles otherwise described.

Further, the terms, such as first, second, and the like, may be used herein to describe elements in the description herein. The terms are used to distinguish one element from another element. Thus, the terms do not limit the element, an arrangement order, a sequence or the like. Therefore, a first element in an embodiment may be referred to as a second element in another element. Likewise, a second element in an embodiment may be referred to as a first element in another embodiment.

Herein, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed embodiment is also included in the scope of the disclosure.

Herein, elements described in various embodiments may not be necessarily essential and may be partially selectable. Therefore, an embodiment including a partial set of elements described in an embodiment is also included in the scope of the disclosure. Also, an embodiment that additionally includes another element to elements described in various embodiments is also included in the scope of the disclosure.

Further, the description described herein is related to a wireless communication network, and an operation performed in the wireless communication network may be performed in a process of controlling a network and transmitting data in a system that controls the wireless communication network (e.g., a base station), or may be performed in a process of transmitting or receiving a signal in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, although the term "new radio (NR) system" is used to distinguish a system according to various examples of the present disclosure from the existing system, the scope of the present disclosure is not limited thereto. Also, the term "NR system" used herein is used as an example of a wireless communication system capable of supporting various subcarrier spacings (SCSs). However, the term "NR system" itself is not limited to the wireless communication system that supports the plurality of SCSs.

FIG. 1 illustrates an example of an NR frame structure and a numerology according to an embodiment of the present disclosure.

In NR, a basic unit of a time domain may be $T_c=1/(\Delta f_{max} \cdot N_f)$. Here, $\Delta f_{max}=480 \cdot 10^3$ and $N_f=4096$. Also, $\kappa = T_s/T_c=64$ may be a constant about a multiple relationship between an NR time unit and an LTE time unit. In LTE, $T_s=1/(\Delta f_{ref} \cdot N_{f,ref})$, $\Delta f_{ref}=15 \cdot 10^3$ Hz, and $N_{f,ref}=2048$ may be defined as a reference time unit.

Frame Structure

Referring to FIG. 1, a time structure of a frame for a downlink/uplink (DL/UL) transmission may include $T_f=(\Delta f_{max} N_f/100) \cdot T_s=10$ ms. Here, a single frame may include 10 subframes corresponding to $T_{sf}=(\Delta f_{max} N_f/1000) \cdot T_s=1$ ms. A number of consecutive orthogonal frequency division multiplexing (OFDM) symbols per subframe may be $N_{symb}^{subframe,\mu}=N_{symb}^{slot} N_{slot}^{subframe,\mu}$. Also, each frame may be divided into two half frames and the half frames may include 0~4 subframes and 5~9 subframes. Here, half frame 1 may include 0~4 subframes and half frame 2 may include 5~9 subframes.

Here, a transmission timing of uplink transmission frame i is determined based on a downlink reception timing at a UE according to the following Equation 1.

In Equation 1, $N_{TA,offset}$ denotes a TA offset value occurring due to a duplex mode difference and the like. Basically, in a frequency division duplex (FDD), $N_{TA,offset}=0$. In a time division duplex (TDD), $N_{TA,offset}$ may be defined as a fixed value by considering a margin for a DL-UL switching time.

$$T_{TA} = (N_{TA} + N_{TA,offset})T_c \quad \text{[Equation 1]}$$

Figure 2:
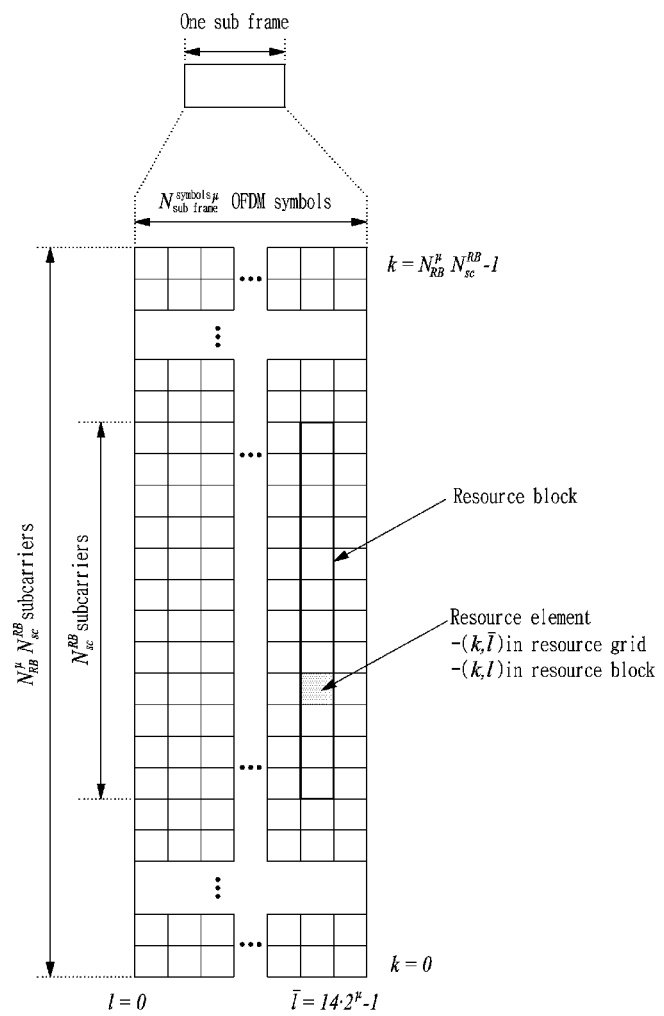
FIG. 2 illustrates an example of a resource grid and a resource block.

FIG. 2 illustrates an example of a resource grid and a resource block.

Referring to FIG. 2, a resource element within a resource grid may be indexed based on each subcarrier spacing. Here, a single resource grid may be generated for each antenna port and for each subcarrier spacing. Uplink/downlink transmission and reception may be performed based on a corresponding resource grid.

A single resource block may be configured on a frequency domain using 12 resource elements and may configure an index $n_{PRB}$ for a single resource block every 12 resource elements as represented by the following Equation 2. An index of the resource block may be used in a specific frequency band or system bandwidth.

$$n_{PRB} = \left\lfloor \frac{k}{N_{sc}^{RB}} \right\rfloor \quad \text{[Equation 2]}$$

Numerologies

Numerologies may be variously configured to meet various services and requirements of the NR system. Also, referring to the following Table 1, the numerologies may be defined based on an SCS, a cyclic prefix (CP) length, and a number of OFDM symbols per slot, which are used in an OFDM system. The aforementioned values may be provided to a UE through upper layer parameters, DL-BWP-mu and DL-BWP-cp (DL) and UL-BWP-mu and UL-BWP-cp (UL).

Also, for example, referring to the following Table 1, if $\mu=2$ and SCS=60 kHz, a normal CP and an extended CP may be applied. In other bands, only the normal CP may be applied.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Here, a normal slot may be defined as a basic time unit used to transmit a single piece of data and control information in the NR system. A length of the normal slot may basically include 14 OFDM symbols. Also, dissimilar to a slot, a subframe may have an absolute time length corresponding to 1 ms in the NR system and may be used as a reference time for a length of another time section. Here, for coexistence and backward compatibility of the LTE and the NR system, a time section, such as an LTE subframe, may be required for an NR standard.

For example, in the LTE, data may be transmitted based on a transmission time interval (TTI) that is a unit time. The TTI may include at least one subframe unit. Here, even in the LTE, a single subframe may be set to 1 ms and may include 14 OFDM symbols (or 12 OFDM symbols).

Also, in the NR system, a non-slot may be defined. The non-slot may refer to a slot having a number of symbols less by at least one symbol than that of the normal slot. For example, in the case of providing a low latency such as an Ultra-Reliable and Low Latency Communications (URLLC) service, a latency may decrease through the non-slot having the number of slots less than that of the normal slot. Here, the number of OFDM symbols included in the non-slot may be determined based on a frequency range. For example, a non-slot with 1 OFDM symbol length may be considered in the frequency range of 6 GHz or more. As another example, a number of symbols used to define the non-slot may include at least two OFDM symbols. Here, the range of the number of OFDM symbols included in the non-slot may be configured with a length of a mini slot up to (normal slot length)−1. Here, although the number of OFDM symbols may be limited to 2, 4, or 7 as a non-slot standard, it is provided as an example only.

Also, for example, an SCS corresponding to $\mu=1$ and 2 may be used in the unlicensed band of 6 GHz or less and an SCS corresponding to $\mu=3$ and 4 may be used in the unlicensed band above 6 GHz. Here, for example, if $\mu=4$, it may be used only exclusive for a synchronization signal block (SSB), which is described below. However, it is provided as an example only and the present disclosure is not limited thereto.

Also, Table 2 shows a number $N_{slot}^{symb,\mu}$ of OFDM symbols per slot for each SCS setting. Table 2 shows a number of OFDM symbols per slot according to each SCS value, a number of slots per frame, and a number of slots per subframe, as provided by Table 1. Here, in Table 2, the values are based on the normal slot having 14 OFDM symbols.

TABLE 2

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Also, as described above, if $\mu=2$ and SCS=60 kHz, the extended CP may be applied. In Table 3, in the case of the extended CP, each value may be indicated based on the normal slot of which the number of OFDM symbols per slot $N_{slot}^{symb,\mu}$ is 12. Here, Table 3 shows the number of symbols per slot, the number of slots per frame, and the number of slots per subframe in the case of the extended CP that follows the SCS of 60 kHz.

TABLE 3

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

Hereinafter, a structure of an SS/Physical Broadcast Channel (PBCH) block in the NR system and an initial cell access structure in the NR system are described.

Here, an NR base station (i.e., gNB) may periodically transmit signals and channels as shown in the following Table 4 to allow an initial cell selection of UEs in a cell.

TABLE 4

| SS/PBCH block (i.e., SSB) |
| SIB1 (System Information Block 1) |
| Other SIBs |

For example, the SS/PBCH block may be the aforementioned SSB. Here, even in the NR system, a UE may need to receive a broadcast channel for forwarding a synchronization signal and important system information transmitted from a corresponding wireless access system to perform an initial wireless access. To this end, the UE may check receiving sensitivity of a synchronization signal to discover an optical cell present in a most excellent channel environment. The UE may perform a frequency/time synchronization and cell identification operation for performing an initial access to an optimal channel among one or more channels in a specific frequency band operated based on the checked receiving sensitivity. The UE may verify a boundary of OFDM symbol timing through the aforementioned operation and then may initiate a PBCH demodulation in the same SSB.

Here, the UE may receive a PBCH demodulation reference signal (DMRS) and may perform a PBCH demodulation. Also, the UE may acquire 3-least significant bit (LSB) information from SSB index information bits through the PBCH DMRS. The UE may acquire information included in a PBCH payload by performing the PBCH demodulation. The UE may perform a procedure of demodulating SIB 1 based on the information acquired through the PBCH.

modulation, a latency reduction, a transmit (Tx) diversity, and feasibility for sTTI. Coexistence with V2X UEs (the same resource pool) is required based on the aforementioned description, and the services are provided based on LTE.

For example, technical features may be classified largely based on four categories as represented by the following Table 5 by considering use cases for supporting a new V2X service as system aspect (SA) 1. Here, in Table 5, "Vehicles Platooning" may be technology that enables a plurality of vehicles to dynamically form a group and similarly operate. Also, "Extended Sensors" may be technology that enables exchange of data gathered from sensors or video images. Also, "Advanced Driving" may be technology that enables a vehicle to drive based on semi-automation or full-automation. Also, "Remote Driving" may be technology for remotely controlling a vehicle and technology for providing an application. Based thereon, further description related thereto may be given by the following Table 5.

TABLE 5

Vehicles Platooning
Vehicles Platooning enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.
Extended Sensor
Extended Sensor enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.
Advanced Driving
Advanced Driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.
Remote Driving
Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

For example, in the NR system, the UE may receive remaining system information (RMSI) through a broadcast signal or channel as system information not transmitted from the PBCH. Also, the UE may receive other system information (OSI) and a paging channel through a broadcast signal or channel as other additional system information.

The UE may access a base station through a random access channel (RACH) process and then perform a mobility management.

Also, for example, when the UE receives an SSB, the UE needs to set an SSB composition and an SS burst set composition.

NR V2X Service

In association with a vehicle-to-everything (V2X) service, the existing V2X service (e.g., LTE Rel-14 V2X) may support a set of basic requirements for V2X services. Here, the requirements are designed basically in sufficient consideration of a road safety service. Therefore, V2X UEs may exchange autonomous status information through a sidelink and may exchange the information with infrastructure nodes and/or pedestrians.

Meanwhile, in a further evolved service (e.g., LTE Rel-15) as the V2X service, new features are introduced by considering a carrier aggregation in a sidelink, a high order Also, the above SA1 may consider all of LTE and NR as enhanced V2X (eV2X) support technology for supporting the new V2X service. For example, an NR V2X system may be a first V2X system. Also, an LTE V2X system may be a second V2X system. That is, the NR V2X system and the LTE V2X system may be different V2X systems. In the following, description is made based on a method of satisfying low latency and high reliability required in an NR sidelink based on the NR V2X system. Here, even in the LTE V2X system, the same or similar composition may be expanded and thereby apply. However, it is provided as an example only and the present disclosure is not limited thereto. That is, even in the LTE V2X system, the present disclosure may apply to an interactable portion and is not limited to the following embodiment. Here, for example, NR V2X capability may not be limited to essentially support only V2X services and V2X RaT to be used may be selected.

NR Sidelink

An NR sidelink may be used for the aforementioned NR V2X service. Here, for example, an NR sidelink frequency may consider FR1 that is a frequency of 6 GHz or less and FR2 (i.e., up to 52.6 GHz) that is a frequency over 6 GHz. Also, for example, the NR sidelink frequency may consider all of unlicensed ITS bands and licensed ITS bands. That is, as described above, a common design method for supporting the respective frequency bands may be required. To this end, an NR sidelink design that considers an NR system may be required. For example, similar to an NR standard design, although it is not beam-based, even an omni-directional Tx/Rx may basically require the NR sidelink design capable of supporting beam-based transmission and reception. However, it is provided as an example only.

Also, for example, a physical channel for NR V2X sidelink may be set. For example, an NR Physical Sidelink Shared Channel (PSSCH) may be a data channel for NR sidelink as a physical channel. Also, for example, an NR Physical Sidelink Control Channel (PSCCH) may be a control channel for NR sidelink as a physical channel. Here, scheduling information for the data channel of the NR sidelink and control information may be forwarded through the NR PSCCH. For example, Sidelink Control Information (SCI) may be transmitted based on a format that defines fields about control information associated with scheduling of the NR sidelink data channel and control information transmitted through the NR PSCCH may be transmitted based on an SCI format.

Also, for example, an NR Physical Sidelink Feedback Channel (PSFCH) may be defined. Here, the NR PSFCH may be an NR Hybrid Automatic Repeat Request (HARQ) feedback channel as a physical channel. Here, HARQ-ACK feedback information, Channel Status Information (CSI), and other information corresponding to the NR sidelink data channel may be forwarded through the NR PSFCH. In detail, Sidelink Feedback Control Information (SFCI) including feedback information may be forwarded through the NR PSFCH. Here, SFCI may include information about at least one of HARQ-ACK, channel quality information (CQI), a precoding matrix indicator (PMI), a rank indicator (RI), reference signal received power (RSRP), reference signal received quality (RSRQ), path-gain/pathloss, a scheduling request indicator (RSI), contention resolution identity (CRI), an interference condition, a vehicle motion, and the like. However, it is provided as an example only and the present disclosure is not limited thereto. Here, for example, the NR PSFCH is further described.

NR V2X QoS Requirements

NR V2X QoS requirements may be a higher level than existing V2X (e.g., LTE V2X) requirements into consideration of a service of the above Table 5. For example, delay may be set within 3 ms to 100 ms based on the following Table 6. Also, reliability may be set between 90% and 99.999%. Also, a data rate may be required up to 1 Gbps.

TABLE 6

Delay: [3, 100 ms]
Reliability: [90%, 99.999%]
Data rate: up to 1 Gbps

That is, as described above, QoS requirements capable of meeting low latency and high reliability may be required into consideration of a V2X service. Here, for example, access stratum (AS) level QoS management may be required to meet the QoS requirements. Also, for example, HARQ and CSI may be required into consideration of link adaptation to meet the QoS requirements. Also, for example, maximum bandwidth (max. BW) capability may differ for each NR V2X UE. That is, AS level information needs to be exchanged between UEs based on the aforementioned description. For example, the AS level information may include at least one of UE capability, QoS related information, radio bearer configuration, and physical layer configuration. Also, for example, the AS level information may further include other information. However, it is provided as an example only and the present disclosure is not limited thereto.

The following Table 7 may show the respective terms applied herein. However, it is provided as an example only and the present disclosure is not limited thereto.

TABLE 7

UMTS (Universal Mobile Telecommunications System):
refers to 3rd Generation (3G) mobile communication technology based on Global System for Mobile Communication (GSM), developed by 3GPP
EPS (Evolved Packet System):
refers to a network system that includes an Evolved Packet Core (EPC) that is a packed switched (PS) core network based on an Internet protocol (IP) and an access network such as LTE/Universal Terrestrial Radio Access Network (UTRAN). A network evolved from Universal Mobile Telephone System (UMTS).
NodeB:
refers to a base station of GERAN/UTRAN and is installed outdoors and has coverage of macro cell scale.
eNodeB:
refers to a base station of E-UTRAN and is installed outdoors and has coverage of macro cell scale.
gNodeB:
refers to a base station of NR and is installed outdoors and has coverage of macro cell scale.
UE (User Equipment):
refers to a user equipment. The UE may also be interchangeably used with terms, terminal, mobile equipment (ME), mobile station (MS), and the like. Also, the UE may be a portable device, such as a laptop computer, a mobile phone, a personal digital assistant (PDA), a smartphone, a multimedia device, etc. The term "UE" or "terminal" in Machine Type Communications (MTC) related content may refer to an MTC device.
RAN (Radio Access Network):
refers to a unit that includes NodeB, eNodeB, and gNodeB, and a radio network controller (RNC) for controlling the same in a 3GPP network, and is present between UEs and provides a connectivity to a core network.
NG-RAN (Next Generation Radio Access Network):
refers to NG-eNB (E-UTRA UP/CP protocol) and gNB (NR UP/CP protocol) base station nodes connected to 5GC (5G Core NW) based on an NG interface in a 3GPP network.
Xn interface:
refers to an interface for interconnection between NG-eNB and gNB.

TABLE 7-continued

PLMN (Public Land Mobile Network):
refers to a network configured to provide a mobile communication service to individuals,
and may be configured for each operator.
Proximity service (or ProSe Service or Proximity based Service):
refers to a service that enables discovery and direct communication between physically
proximate apparatuses, communication through a base station, or communication through a
third apparatus. Here, user plane data is exchanged through a direct data path without going
through a 3GPP core network (e.g., EPC).
LTE SFN (System Frame Number):
refers to a frame index for time domain reference of LTE.
NR SFN (System Frame Number):
refers to a frame index for time domain reference of NR.
NR DFN (Direct Frame Number):
refers to a frame index for time domain reference of an NR sidelink NR Sidelink Design Hereinafter, an NR V2X sidelink design method that meets requirements for the aforementioned evolved V2X (i.e., eV2X) services will be described.

In more detail, a synchronization procedure and method required to form a wireless link for an NR sidelink are further described. For example, as described above, in NR sidelink design, FR1 and FR2 (i.e., up to 52.6 GHz) may be considered as NR sidelink frequencies and unlicensed ITS bands and licensed ITS bands may be considered as frequency band and range in which an NR system operates. Also, for example, the availability of an LTE (NG-eNB)/NR Uu link that is a 3GPP NG-RAN of Table 7 may be considered in the NR sidelink design.

Also, for example, design fore V2X synchronization information forwarding and signal transmission/reception to meet higher requirements from the evolved V2X services may be considered. Here, a frequency for NR V2X sidelink communication may further consider at least one of elements of the following Table 8 based on the following technologies required in the new system, which differs from the existing system (e.g., That is, there is need to meet new V2X service requirements by applying an NR V2X sidelink based on NR radio access technology, particularly, uplink transmission related technologies as shown in the following Table 8.

Also, other elements may be considered by considering the new system as well as the following Table 8. However, it is provided as an example only and the present disclosure is not limited thereto.

TABLE 8

Scalable frequency use and configuration (e.g., Bandwidth Part [BWP]) according to broad
frequency band and maximum bandwidth capability of UE
Various numerologies (e.g., variable SCSs, number of OFDM symbols per slot (or
subframe))
Slot format (slot/non-slot)
Beam-based transmission/reception to cope with signal attenuation in a frequency band of
6 GHz or more corresponding to a high frequency band
Configured grant-based uplink transmission/reception to provide low latency Also, as described above, for example, a signal, a basic slot structure, a physical resource, and a physical channel of NR V2X sidelink may be represented as the following Table 9.

TABLE 9

NR PSSCH (Physical Sidelink Shared Channel)
Refers to a Physical layer NR SL data channel.
NR PSCCH (Physical Sidelink Control Channel)
Refers to a channel for forwarding control information as well as scheduling information of
an NR SL data channel as a physical layer NR SL control channel.
NR SLSS/PSBCH (Sidelink Synchronization Signal/Physical Sidelink Broadcast Channel)
block
Refers to a synchronization and broadcast channel block in which an NR SL
synchronization signal and a broadcast channel are transmitted on a single continuous time
in a physical layer. Periodical transmission is performed based on a set of at least one block
index to support beam-based transmission on an NR frequency band. The synchronization
signal includes a PSSS and a SSSS and a sequence for the corresponding signal is generated
based on at least one SLSSID value. The PSBCH is transmitted with SLSS for the purpose
of forwarding system information required to perform V2X SL communication. Likewise,
periodic transmission is performed based on a set of SLSS/PSBCH block indices to support
beam-based transmission.

Figure 3:
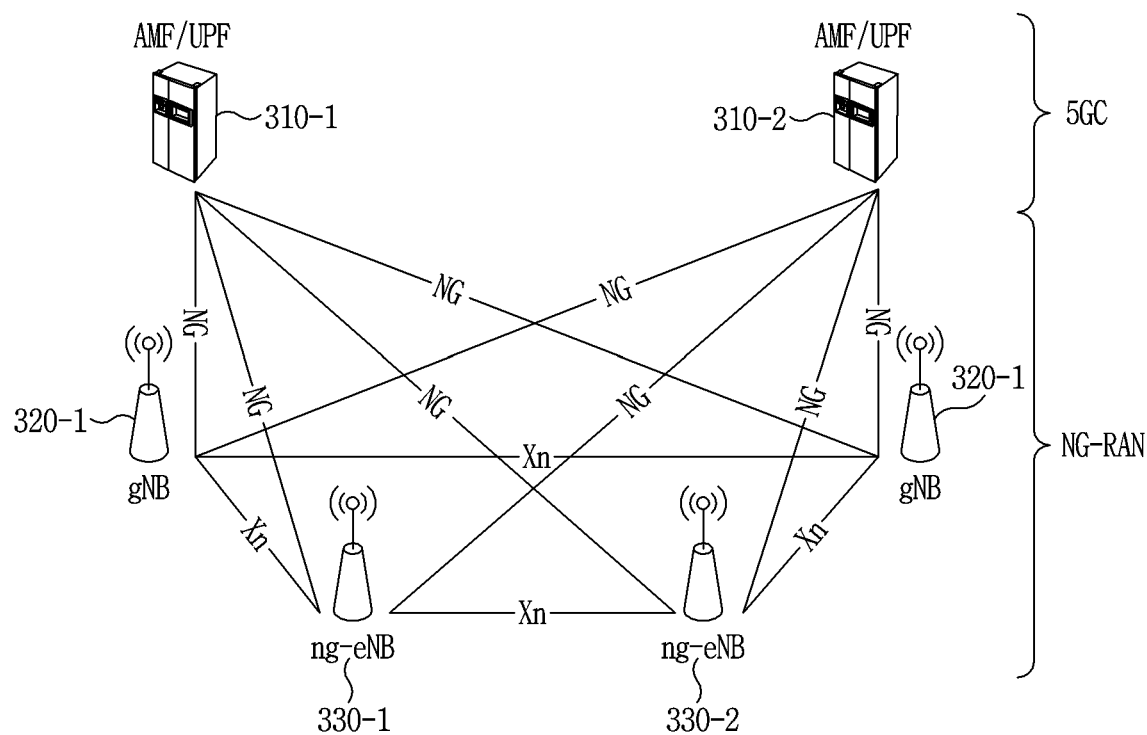
FIG. 3 illustrates an example of a system architecture.

Here, for example, FIG. 3 illustrates an example of a basic network architecture composition considered for an NR V2X sidelink.

For example, referring to FIG. 3, NG interfaces may be set between nodes 310-1 and 310-2 of a 5-th generation core (5GC NW) and nodes 320-1, 320-2, 330-1, and 330-2 of an NG-RAN. Also, Xn interfaces may be set between the nodes 320-1, 320-2, 330-1, and 330-2 of the NG-RAN. Here, in the above architecture, corresponding nodes may be interconnected through the corresponding Xn interface based on gNB (NR UP/CP protocol) corresponding to the nodes 320-1 and 320-2 and ng-eNB (E-UTRA UP/CP protocol) corresponding to the nodes 330-1 and 330-2, which constitute the NG-RAN. Also, as described above, in the 5GC, corresponding nodes may be interconnected through a corresponding NG interface. Here, for example, in the above architecture, all of an LTE sidelink UE and an NR sidelink UE may be controlled by the NG-RAN (i.e., LTE Uu and NR Uu) based on the gNBs and ng-eNBs. Therefore, when transmitting synchronization information, the NR sidelink UE may receive synchronization information from the LTE Uu or NR Uu link, and may transmit NR sidelink synchronization information (e.g., SL synchronization signal/SL Physical Broadcast Channel (PBCH)) based on the received synchronization information. However, it is provided as an example only and the present disclosure is not limited thereto. That is, the NR sidelink UE may also acquire the synchronization information through the LTE Uu link as well as the NR Uu link.

Meanwhile, with respect to V2X sidelink communication, V2X sidelink UEs may perform the V2X sidelink communication. Here, predetermined conditions need to be met such that the V2X sidelink UEs may start the communication. The conditions may be represented by the following Table 10. That is, a V2X sidelink UE may perform V2X sidelink communication in a Radio Resource Control (RRC) idle mode, inactive mode, or connected mode. Also, V2X sidelink UEs that perform the V2X sidelink communication need to be registered on a selected cell on a using frequency or need to belong to the same PLMN. Also, if a V2X sidelink UE is an OOC on a frequency for V2X sidelink communication, the V2X sidelink UE may perform the V2X sidelink communication only when it is possible to perform the V2X sidelink communication based on pre-configuration.

TABLE 10

If a UE is in an RRC_IDLE or INACTIVE or CONNECTED mode in a specific cell,
If a UE is registered to a selected cell on a frequency used for V2X SL communication or belongs to the same PLMN,
If a UE is an OCC on a frequency for a V2X SL communication operation, and if a UE is capable of performing V2X SL communication based on pre-configuration Here, as described above, to start the V2X sidelink communication, sidelink synchronization information may be required. Therefore, the UE needs to transmit the sidelink synchronization information. Here, a Tx UE (sidelink Tx UE) may receive a configuration for transmitting sidelink synchronization information prior to transmitting corresponding synchronization information. Here, for example, the Tx UE may receive the configuration for transmitting the sidelink synchronization information based on a system information message or an RRC reconfiguration message (in the case of an RRC CONNECTED UE) broadcasted from the above NG-RAN nodes. Also, for example, if an NR V2X sidelink UE (hereinafter, referred to as a UE) is absent in an NG-RAN, the UE may transmit sidelink synchronization information based on the pre-configured information, which is described above.

Figure 4:
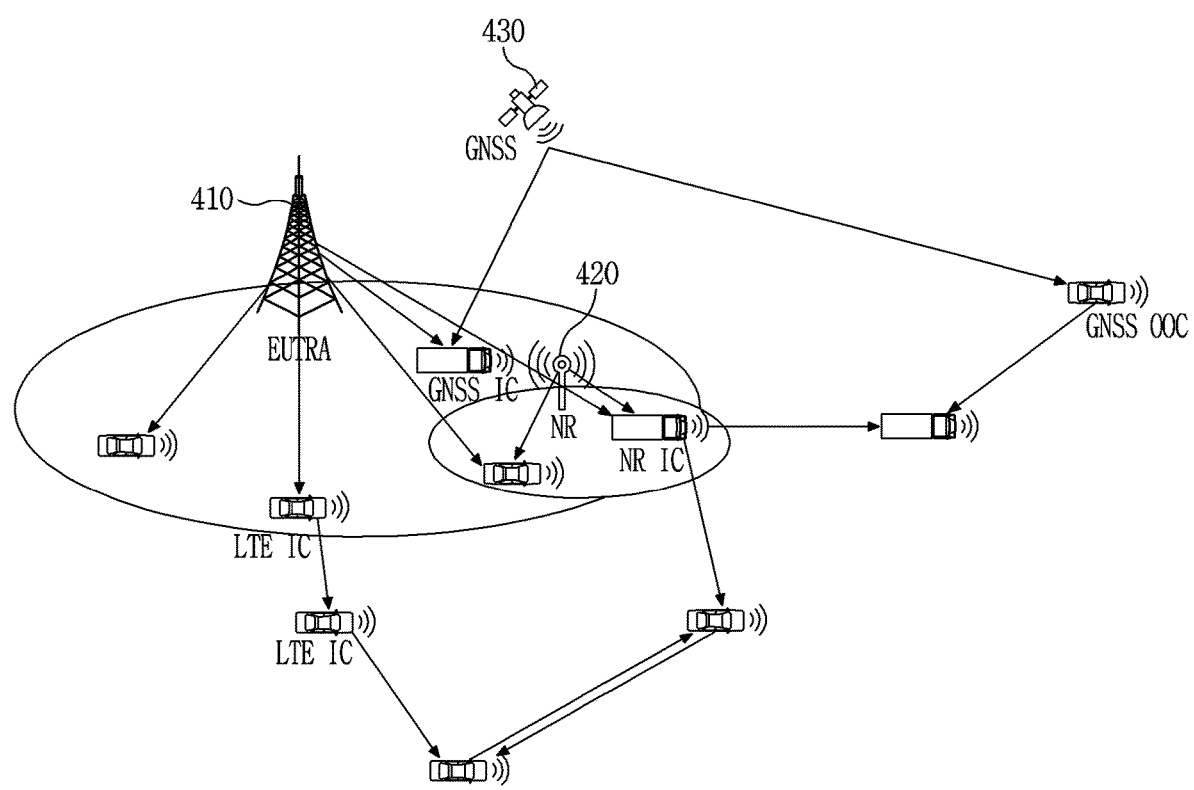
FIG. 4 illustrates an example scenario in which sidelink communication is performed in a wireless network.

Meanwhile, FIG. 4 illustrates an example of a scenario in which NR V2X sidelink communication is performed in a 3GPP network based on the aforementioned description. Here, the NR V2X sidelink communication may be performed on the 3GPP network (hereinafter, NG-RAN). Additionally, presence of a Global Navigation Satellite System (GNSS) signal may be considered.

In detail, referring to FIG. 4, each of NR V2X sidelink UEs may be an IC or an OOC based on EUTRA NG-eNB 410, may also be an IC or an OOC based on gNB 420, and may also be an IC or an OOC based on GNSS 430. Here, NR V2X sidelink UEs may select a resource of synchronization reference based on a position and capability of a UE. Also, for example, in addition to the scenario of FIG. 4, scenarios shown in the following Table 11 may be considered. It is provided as an example only and the present disclosure is not limited thereto.

TABLE 11

NR Uu CONNECTED/IDLE/Inactive for NR Sidelink
NG-eNB Uu CONNECTED/IDLE for NR Sidelink
EN-DC or MR-DC for NR Sidelink Meanwhile, in the following, an NR SCS may refer to one of an SCS value for NR DL SS/PBCH, an SCS value for an NR BWP (data/control channel), and a reference SCS value defined/set for comparison of NR V2X SCS values. As another example, the NR SCS may refer to one of an SCS value for NR V2X SLSS/PSBCH, an SCS value for NR V2X BWP or a resource pool (data/control channel), and a reference SCS value defined/set for comparison of NR V2X SCS values. However, it is provided as an example only and the present disclosure is not limited thereto. Also, for example, 30 kHz SCS value may be set as a default value and used for 5.9 GHz ITS spectrum. However, it is provided as an example only and the present disclosure is not limited thereto.

In the case of performing NR V2X sidelink communication, data transmission may be performed based on unicast/ groupcast. Here, for example, unicast transmission may refer to transmitting a message from a single UE to another UE, that is, one-to-one transmission. Also, broadcast transmission may refer to a scheme of transmitting a message to all of UEs regardless of whether a service is supported at an Rx UE. That is, a single UE may transmit a message regardless of whether a plurality of Rx UEs is supporting a service. Meanwhile, a groupcast transmission scheme may be a scheme of transmitting a message to a plurality of UEs that belongs to a group.

Here, for example, whether to activate the unicast, groupcast, or broadcast data transmission and reception and whether to perform a session connection may be determined at an upper layer. That is, although a physical layer of a V2X UE may operate based on an instruction that is determined in an upper layer, it is provided as an example only and the present disclosure is not limited.

Also, for example, a V2X UE may perform corresponding transmission and reception after a session for corresponding unicast or groupcast data transmission is formed. When a V2X UE performs transmission and reception based on the aforementioned session, physical layer parameter information for data transmission corresponding to unicast or groupcast may be known in advance in the physical layer of the V2X UE. For example, the V2X UE may receive and recognize in advance the aforementioned information from a base station. As another example, the aforementioned information may be information preset to the V2X UE. Here, for example, unicast or multicast data transmission and reception may apply only to a case in which a relatively small number of V2X UEs are present around a Tx V2X UE and a session is stably maintained. In addition, if a session is unstable or if adjacent V2X UEs vary a lot, data transmission may be performed based on broadcast transmission. Here, it is provided as an example only and the present disclosure is not limited thereto.

Also, for example, as described above, unicast or groupcast transmission and reception may be determined in an application layer end as an upper layer. Here, for example, data allocable to transmission and reception generated in an application layer may be not directly mapped to a radio layer. Here, for example, in the case of performing the unicast or groupcast transmission and reception, a mapping relationship or a connection establishment procedure may be required to perform data transmission and reception on the radio layer. However, it is provided as an example only and the present disclosure is not limited thereto.

Also, for example, in the case of performing the unicast data transmission and reception, corresponding Tx and Rx UEs may need to establish a session by performing a procedure (e.g., a discovery procedure) of discovering their presence, and such session establishment may be performed based on various methods. Here, the session establishment between the UEs may be performed with assistance of a base station. The base station may gather position information of UEs and may determine whether UEs capable of performing unicast or groupcast data transmission and reception are adjacent to each other. Here, for example, the base station may determine whether the UEs are adjacent to each other based on a threshold. Here, a predetermined value may be used to determine the threshold. When the UEs in a cell are determined to be adjacent to each other, the base station may initialize a corresponding discovery procedure and the UEs may perform the corresponding discovery procedure to discover each other based on an initialization procedure. Also, the base station may determine whether an adjacent V2X SL UE is present by designing a new discovery channel and by periodically transmitting and receiving the corresponding channel. Also, the base station may determine whether an adjacent UE is present by transmitting a corresponding discovery message on a V2X data channel. However, it is provided as an example only and the present disclosure is not limited thereto. That is, session establishment for unicast or groupcast data transmission and reception may be completed based on the aforementioned procedures. Subsequently, the upper layer may notify the physical layer of information about the session establishment and may perform a physical layer operation, such as HARQ-ACK, CSI, and link adaptation.

At least some communications (e.g., wireless communication in accordance with 3GPP 5G NR Release 16, or any earlier or later releases, or any other wireless communications) may use one or more bandwidth parts (BWPs). For example, for certain transmission and reception of a signal, a frequency bandwidth to be used may not need to be as wide as a bandwidth of a serving cell. The bandwidth (e.g., the bandwidth of a BWP) may be configured as a narrower bandwidth than the bandwidth of the serving cell. A frequency position of the bandwidth may be shifted. A bandwidth of an OFDM subcarrier may be changed. It may be defined as a partial set of the entire frequency bandwidth of the serving cell, which may be referred to as a BWP or any other terminology.

A serving cell may include one or more BWPs. One or more messages (e.g., one or more RRC messages) configuring the BWPs of the serving cell may include information about a plurality of different BWPs for a wireless user device (e.g., by way of signaling from a base station). The BWPs of the serving cell may include a pair of an uplink BWP and a downlink BWP (e.g., at all times). Composition information about a single BWP may include composition information about an uplink and a downlink (e.g., at all times). A number of BWPs to be activated may be limited to a single BWP among the plurality of BWPs or more than one BWPs may be activated simultaneously. If the wireless user device is capable of activating at least one BWP, the base station may verify information about a maximum number of active BWPs of the wireless user device and may also simultaneously activate the plurality of BWPs based on the verified information. For example, if the wireless user device is configured with the serving cell, a single BWP may be activated for the serving cell (e.g., without separate signaling from the base station). The wireless user device may perform access to the serving cell and the wireless user device may use the activated BWP (e.g., for an initial access or other types or random access). The initial BWP may be used (e.g., until the wireless user device receives composition information for the wireless user device from the base station).

If the wireless user device receives the composition information for the wireless user device (e.g., UE composition information) from the base station, the wireless user device may be configured with a default BWP. The default bandwidth may be configured as a relatively narrow bandwidth (e.g., narrower than other BWPs). If an amount of data to be transmitted and received is small, the wireless user device may reduce battery consumption of the wireless user device by activating the default bandwidth. If the wireless user device is not configured with the default bandwidth, the wireless user device may use the initial BWP for the same or similar purposes.

The activated BWP of the serving cell may be switched with another BWP depending on one or more circumstances. This operation may be referred to as BWP switching. For a BWP switching, the wireless user device may inactivate the currently activated BWP and may activate a new BWP. The BWP switching operation may be performed, for example, if the wireless user device receives BWP switching order (e.g., through a PDCCH order) or any other BWP switching triggering event. The BWP switching operation may be performed through a predetermined timer "bwp-InactivityTimer" as a timer for BWP inactivity. The BWP switching operation may be performed in response to starting a random access. As further described herein, one or more conditions and/or events that may cause a BWP switching will be described. The base station may change an active BWP in the serving cell of the wireless user device depending on one or more circumstances. If the wireless user device determines to change an active BWP, the base station may notify the wireless user device that a BWP is switched. The notification of the BWP switching may be indicated through a PDCCH or any other downlink signaling. The wireless user device may perform the BWP switching operation through BWP switching related information (e.g., included in the PDCCH and/or an RRC configuration).

The timer "BWPInactivityTimer" may be configured for each serving cell or may be commonly used for a plurality of BWPs. "BWPInactivityTimer" may be a timer for inactivating the activated BWP (e.g., if the timer expires). A timer performing the same functionality may be "BWPInactivityTimer" or any other timers. "BWPInactivityTimer" may be used for clarity of description, other timers or timer parameters may perform the functions or operations of "BWPInactivityTimer" described herein. If the timer (e.g., "BWPInactivityTimer") expires, the wireless user device may inactivate the current activate BWP and may activate the default BWP. BWP switching may be performed using the default BWP or any other BWPs. If the wireless user device is not configured with the default BWP, the wireless user device may switch to the initial BWP. The wireless user device may reduce battery consumption by monitoring a narrow bandwidth through the BWP switching operation. Start and restart condition of the timer may be set (e.g., represented by the following Table 2). If the wireless user device needs to maintain the activated BWP as follows, the timer may start or restart to prevent the activated BWP from being inactivated or from being switched to another BWP. One or more features of the BWP is further described below.

At least some communications (e.g., wireless communication in accordance with 3GPP 5G NR Release 16, or any earlier or later releases, or any other wireless communications) have a wide system bandwidth configurable on a single carrier, which differs from other types of communications, such as LTE. If the NR system (or other communication systems) operates in frequency range 2 (i.e., over 6 GHz frequency bands) in which many frequency bands and bandwidths thereof are available for the NR system, a system bandwidth available for the base station and a bandwidth in which the wireless user device actually operates may be differently configured. The system bandwidth assumed by the base station (or a network and/or system) and the frequency bandwidth used for the wireless user device to actually operate may conform to 3GPP NR standards (or any other configurations) and may be different in view of capability of maximum RF bandwidth of the base station and the wireless user device, and wireless user device implementations (e.g., UE implementation) and related operation. Configurations of the frequency bandwidth used by the wireless user device may be provided from the base station, which may correspond to a BWP configuration. The BWP configuration used by the wireless user device may vary based on a mode of the wireless user device and a BWP configuration status. In general, bandwidth part (BWP) configuration provided from the base station to the wireless user device through system information for initial cell access may be referred to as an initial active BWP, which may be used to perform a random access procedure.

BWPs may include an initial DL BWP. As the BWP provided from the base station to the wireless user device through system information for the initial cell access of the wireless user device, a bandwidth about an initial DL active BWP for System Information Block (SIB1) transmission and related Control Resource Set (CORESET) configuration information may be provided through an SS/PBCH block reception. The initial DL active BWP may be initial UE bandwidth information for receiving SIB1 information.

BWPs may include an initial UL BWP. Within the SIB1, configuration information for performing a random access procedure may be provided and information about an initial uplink bandwidth (e.g., an initial UE uplink bandwidth) for some message transmission/reception within the random access procedure. For example, initial UL active BWP information (e.g., a frequency position, a bandwidth, numerology, etc.) may be provided. Through this information, an uplink PUSCH message of a random access procedure (e.g., msg.3 or an uplink RACH message of a four-step random access procedure) may be transmitted. Numerology of the initial UL active BWP may be identical to numerology information for msg.3 transmission.

PUSCH transmission (e.g., for msg.3) and PUCCH transmission for HARQ feedback transmission (e.g., for msg.4 or a downlink response message of a four-step random access procedure) within the RACH procedure may be limited to be within the initial active UL BWP.

In an unpaired spectrum, such as TDD, an initial DL BWP and an initial UL BWP may share the same center frequency.

A bandwidth of the initial active UL BWP may be generally less than or equal to a minimum Tx bandwidth of the UE.

From wireless user device perspective, only a single initial active UL BWP may be supported per cell-defined SSB.

Once the wireless user device accesses a network through the aforementioned initial cell access procedure, BWP configuration up to maximum 4 BWPs may be provided to the wireless user device (e.g., through wireless user device-specific RRC signaling). Only a single BWP among the plurality of BWPs may be active and used.

The following basic configuration information may be generally included as the BWP configuration.

Numerology

Frequency location (e.g., center frequency)

Bandwidth (e.g., number of PRBs)

PDCCH/PDSCH/PUSCH, a configured grant, an SRS transmission related configuration, and a beam failure recovery (BFR) configuration may be included and thereby provided to the wireless user device.

Numerology and Waveform Supported in NR V2X

Numerology and waveform supported in one or more wireless communications (e.g., NR2V2X or any other wireless communications) may be configured (e.g., represented by the following Table 12). Referring to Table. 12, the numerology for NR V2X may support a normal CP for 15 kHz, 30 kHz, and 60 kHz and an extended CP for 60 kHz for PSCCH/PSSCH and PSFCH in FR1 (e.g., frequency ranges below 6 GHz). The numerology may support a normal CP for 60 kHz and 120 kHz and an extended CP for 60 kHz for PSCCH/PSSCH and PSFCH in FR2 (e.g., frequency ranges equal to or above 6 GHz). Also, the waveform for NR V2X may support only CP-OFDM without supporting DFT-S-OFDM.

TABLE 12

| | FR 1 | FR 2 |
|---|---|---|
| PSSCH/PSCCH and PSFCH | Normal CP for 15 kHz, 30 kHz, 60 kHz Extended CP for 60 kHz | Normal CP for 60 kHz, 120 kHz Extended CP for 60 kHz |
| Waveform | Supported only CP-OFDM (i.e., No support of DFT-S-OFDM for NR SL in Rel-16) | |

One or more resource pools may be configured for one or more wireless user devices (e.g., by higher layer signaling, such as an RRC message). The one or more resource pools may include one or more NR V2X resource pools. For example, the NR V2X resource pool may include a set of time and frequency resources available for sidelink transmission and reception (e.g., for NR V2X communication). The resource pool may be in a radio frequency bandwidth (RF BW). Only a single numerology (one different numerologies) may be used in a single resource pool. The wireless user device may be configured with at least one pool on a single carrier. A single resource pool for PSSCH may include discontinuous time resources, and frequency resources may include continuous or discontinuous Physical Resource Blocks (PRBs).

Figure 5:
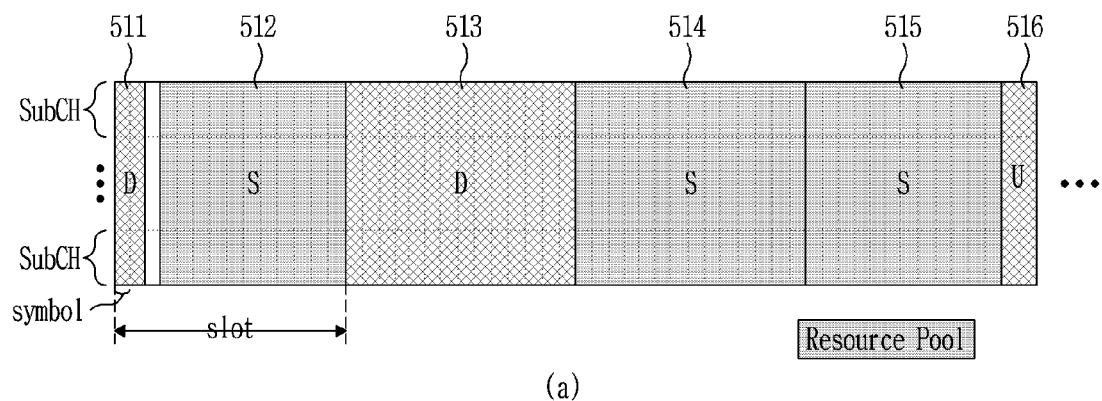
FIG. 5 illustrates an example of a sidelink resource pool.
Figure 5:
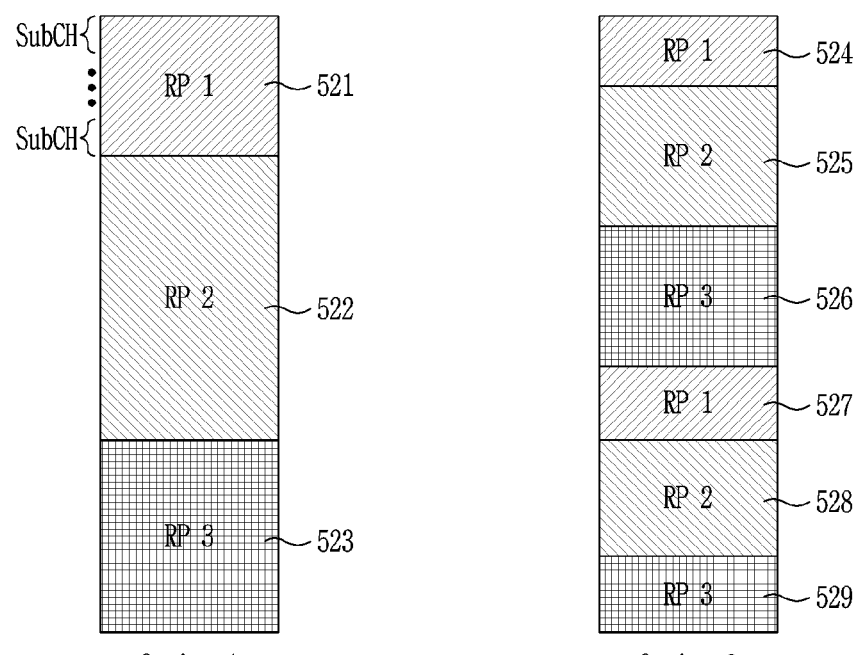

Referring to FIG. 5, part (a), a resource pool for PSSCH may include discontinuous time resources in the NR V2X resource pool. If an NR V2X service is provided on a licensed carrier on which an NR Uu link operates, the wireless user device may be configured with the NR V2X resource pool through a base station or a pre-configuration in addition to a physical resource for the NR Uu link. Resources 512, 514, and 515 for sidelink may be discontinuously configured based on a symbol unit or a slot unit within the NR V2X resource pool. If the sidelink resource pool is configured on the licensed carrier on which the NR Uu link operates, they may be multiplexed on different symbols or slots as shown in FIG. 5, part (a). A single resource pool for PSSCH may be configured as discontinuous time resources.

Referring to FIG. 5, part (b), the resource pool for PSSCH may include continuous or discontinuous PRBs in the NR V2X resource pool. For Option 1 of FIG. 5, part (b), each of resource pools 521, 522, and 523 for PSSCH may include continuous PRBs. For Option 2 of FIG. 5, prat (b), each of resource pools 524, 525, 526, 527, 528, and 529 for PSSCH may include discontinuous PRBs. Resource pool 1 (524 and 527) may be configured on discontinuous frequency resources as shown in FIG. 5, part (b). The wireless user device may perform sidelink communication based on the resource pool, and the operation is further described below.

BWPs may comprise one or more NR V2X sidelink BWPs. The NR V2X sidelink BWP may be configured on a single sidelink carrier. The corresponding sidelink carrier may be a licensed carrier on which an NR Uu link operates or a C-V2X dedicated unlicensed carrier, such as an ITS band. The NR V2X sidelink BWP may be defined independently from an NR Uu BWP within the licensed carrier. Only a single NR V2X sidelink BWP (or multiple NR V2X sidelink BWPs) may be configured on a single carrier. Although the aforementioned numerology configuration may include numerology configured NR V2X sidelink BWP configuration, aspects are not limited thereto. The wireless user device may use the NR V2X sidelink BWP for transmission (Tx) and reception (Rx). The resource pool may be configured within a single sidelink BWP. The wireless user device may assume that an active uplink BWP and a configured sidelink BWP are identical at a specific point in time of the same carrier. Based on the aforementioned description, the wireless user device may perform sidelink communication.

One or more time resources may include one or more time resources for PSFCH. PSFCH time resources may be configured (e.g., by the base station) per a slot, per two slots, or per 4 slots in the V2X sidelink resource pool. PSFCH time resources may be pre-configured (e.g., for the wireless user device) per a slot, per two slots, or per 4 slots in the V2X sidelink resource pool. If a wireless user device receives sidelink data (e.g., PSSCH), the wireless user device may perform PSFCH transmission after a minimum time to prepare PSFCH transmission. The minimum time may be configured by considering a processing time of the wireless user device.

Figure 6:
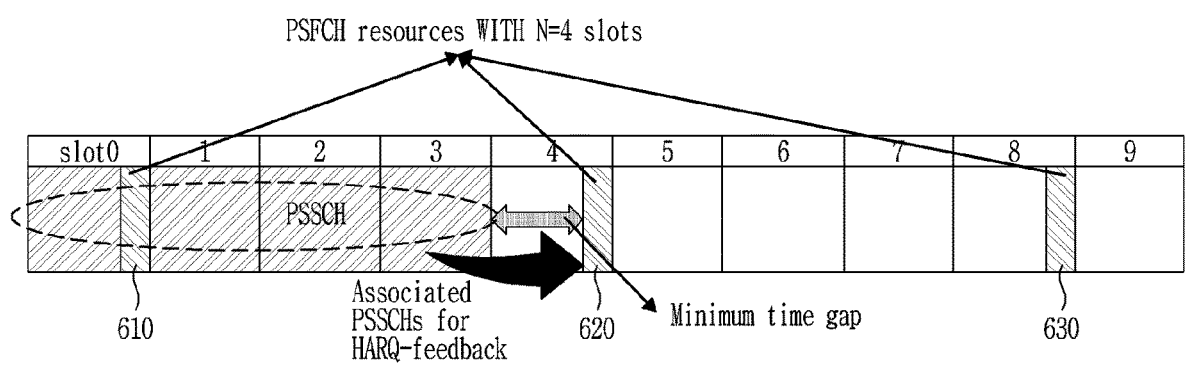
FIG. 6 illustrates an example of Physical Sidelink Feedback Channel (PSFCH) time resources.

Referring to FIG. 6, PSFCH time resources may be configured per 4 slots in the resource pool. The PSFCH may be transmitted per 4 slots (or per any other number of slots). In FIG. 6, a PSFCH time resource 610 may be configured in slot 0 and PSFCH time resources 620 and 630 may be configured in slot 4 and slot 8, respectively. Other configurations may be possible. A wireless user device (e.g., an Rx UE) may transmit HARQ feedback information to another wireless user device (e.g., the Tx UE) through a PSFCH time resource associated with a PSSCH. Referring to FIG. 6, a PSSCH of slot 0, a PSSCH of slot 1, a PSSCH of slot 2, and a PSSCH of slot 3 may be associated with the PSFCH time resource 620 of slot 4. The wireless user device may transmit the PSFCH through a PSFCH time resource (e.g., the first PSFCH time resource 620 occurring after the sidelink HARQ transmission) after a minimum time gap for sidelink HARQ feedback transmission. In FIG. 6, the wireless user device may perform sidelink HARQ feedback transmission through the PSFCH time resource 620 of slot 4 that is a PSFCH time resource occurring after the minimum time gap. If the minimum time gap is large, the wireless user device may perform the sidelink feedback transmission through the PSFCH time resource 630 of slot 8, instead of using the PSFCH time resource 620 of slot 4. However, aspects are not limited thereto.

Figure 7:
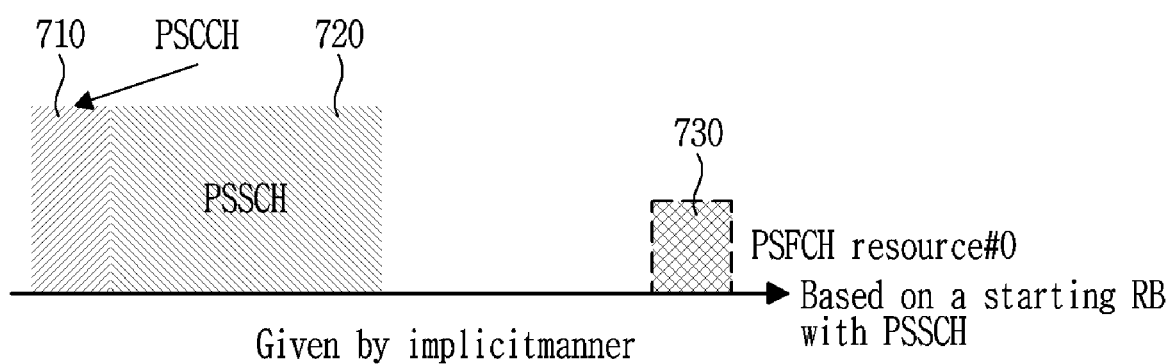
FIG. 7 illustrates an example of PSFCH frequency resources.

PSFCH resources may include frequency resources and/or code resources. In addition to time resources for the PSFCH, frequency resources may need to be determined. Referring to FIG. 7, a wireless user device (e.g., Tx UE) may transmit a PSCCH 710 and a PSSCH 720 to another wireless user device (e.g., an Rx UE). A frequency resource 730 used to transmit a PSFCH may be implicitly determined based on a frequency resource used to transmit the PSSCH 720. The frequency resource 730 used to transmit the PSFCH may be determined based on a starting RB (or a starting subchannel) of the frequency resource used to transmit the PSSCH 720. The frequency resource 730 used to transmit the PSFCH may be determined based on a lowest RB index or a lowest subchannel index in the frequency resource used to transmit the PSSCH 720. However, aspects are not limited thereto.

A wireless user device may perform a sidelink HARQ procedure. Whether to perform sidelink HARQ feedback may be configured (e.g., by an upper layer, such as RRC signaling). The sidelink HARQ feedback may be differently performed based on a cast scheme. The sidelink HARQ feedback may be enabled or disabled based on a configuration (e.g., by the upper layer) in unicast and groupcast. If a HARQ feedback-enabled wireless user device, based on the upper layer configuration, performs a HARQ feedback transmission for a groupcast transmission, it may be determined whether the corresponding wireless user device actually performs the HARQ feedback transmission for the groupcast transmission based on a channel status (e.g., RSRS), Tx-Rx distance, QoS requirements, and other conditions. If sidelink HARQ feedback for unicast is enabled, the wireless user device (e.g., the Rx UE) may transmit HARQ-ACK/NACK to another wireless user device (e.g., the Tx UE) depending on whether a corresponding transport block (TB) is successfully decoded.

If sidelink HARQ feedback for groupcast is enabled and a condition regarding the actual HARQ feedback transmission status is satisfied (e.g., a condition about the Tx-Rx distance), the wireless user device (e.g., the Rx UE) may transmit only HARQ NACK to another wireless user device (e.g., the Tx UE). If the corresponding TB is not successfully decoded, the wireless user device (e.g., the Rx UE) may transmit HARQ NACK to another wireless user device (e.g., the Tx UE) (Option 1). If sidelink HARQ feedback for groupcast is enabled, a wireless user device (e.g., the Rx UE) may transmit HARQ-ACK/NACK to another wireless user device (e.g., the Tx UE) depending on whether the corresponding TB is successfully decoded (Option 2). For the groupcast, a sidelink HARQ feedback report scheme may be supported in a different manner. If a wireless user device (e.g., the Rx UE) reports only HARQ NACK as groupcast (e.g., Option 1), a wireless user device (e.g., the Rx UE) may determine whether to perform reporting by considering a distance from another wireless user device (e.g., the Tx UE). If the Tx-Rx distance is less than or equal to a required communication range, a wireless user device (e.g., the Rx UE) may transmit the HARQ feedback for PSSCH. If the Tx-Rx distance is greater than the required communication range, a wireless user device (e.g., the Rx UE) may not perform the HARQ feedback transmission for PSSCH.

For the groupcast, although the HARQ feedback is enabled, a wireless user device (e.g., the Rx UE) may not perform HARQ report based on the Tx-Rx distance. A position of a wireless user device (e.g., the Tx UE) may be indicated through SCI associated with the PSSCH. A wireless user device (e.g., the Rx UE) may calculate the Tx-Rx distance based on information included in SCI and its position information and may determine whether to perform the HARQ feedback accordingly.

An NR V2X sidelink design that meets requirements for new evolved V2X (i.e., eV2X) services will be described based on the aforementioned description. A sidelink HARQ transmission method in which, if a mode 1 wireless user device performs NR sidelink unicast transmission, the mode 1 wireless user device may transmit sidelink HARQ information to a base station, which will be further described. An NR sidelink frequency for an NR sidelink operation may be within FR1 (410 MHz~7.125 GHz) and FR2 (24.25 GHz 52.6 GHz) and may apply to all of unlicensed ITS bands and licensed ITS bands, and a frequency band range in which the NR system operates, without being limited to a specific band. The NR sidelink frequency may commonly apply to all of the aforementioned FR 1 and FR 2. The availability of an LTE (ng-eNB)/NR (gNB) Uu link (e.g., configured in a 3GPP NG-RAN) may be considered for NR V2X sidelink transmission/reception procedures. By considering the aforementioned aspects, ng-eNB or gNB on the NG-RAN may be described as the base station. However, aspects are not limited to a specific type.

A wireless user device may repot sidelink HARQ (e.g., V2X SL HARQ) to a base station. A wireless user device (e.g., an NR V2X Tx UE) configured with a base station scheduling mode (i.e., mode 1) may be scheduled with a sidelink transmission resource through the base station. The mode 1 wireless user device may request the base station for a transmission resource to transmit V2X service-related data to another wireless user device through a sidelink. in response to the request from the wireless user device, the base station may schedule the sidelink transmission resource and provide the scheduled resource to the wireless user device. The wireless user device may perform a V2X sidelink transmission using the scheduled resource.

A wireless user device (e.g., the V2X Tx UE) configured with a wireless user device auto-control mode (i.e., mode 2) may autonomously select a sidelink transmission resource and may transmit data to another wireless user device through the selected resource. The wireless user device may be pre-configured with a transmission resource pool to be used by the wireless user device (e.g., the V2X Tx UE). The wireless user device may autonomously select a portion of resources to be used for actual V2X data transmission from among resources within the transmission resource pool.

A wireless user device (e.g., the V2X Tx UE) may acquire SL HARQ-ACK feedback information about the PSSCH (data channel) transmitted to another wireless user device (e.g., the V2X Rx UE) through the sidelink, from the other wireless user device (e.g., the Rx UE) through PSFCH. If the wireless user device (e.g., the Tx UE) is in a base station scheduling mode, the wireless user device (e.g., the Tx UE) may transmit corresponding sidelink HARQ-ACK feedback information to the base station (e.g., through an NR Uu link) to inform the base station regarding whether to perform retransmission scheduling. The wireless user device (e.g., the Tx UE) may transmit the corresponding sidelink HARQ-ACK feedback information to the base station (e.g., using an NR Uu uplink channel). The wireless user device (e.g., the Tx UE) may multiplex and thereby transmit CSI (e.g., HARQ-ACK, CQI, PMI, RI, etc.) on the NR Uu link and the sidelink HARQ feedback information through the uplink channel. The wireless user device (e.g., the Tx UE) may transmit only the corresponding sidelink HARQ-ACK feedback information to the base station through the uplink channel. However, aspects are not limited thereto.

Figure 8:
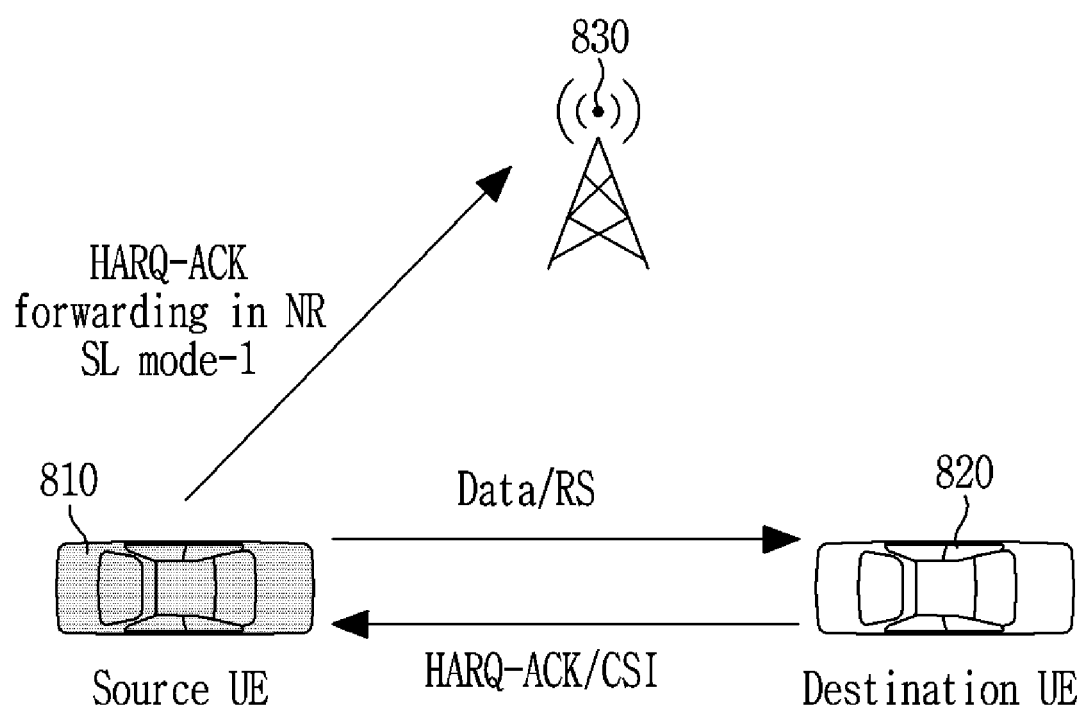
FIG. 8 illustrates an example method for reporting sidelink Hybrid Automatic Repeat Request (HARQ) feedback.

Referring to FIG. 8, a wireless user device (e.g., an NR V2X Tx UE 810) corresponding to a source wireless user device may transmit a PSSCH (i.e., data) to another wireless user device (e.g., an NR V2X Rx UE 820) corresponding to a destination wireless user device through a sidelink. The wireless user device (e.g., NR V2X Tx UE 810) may receive HARQ-ACK feedback information from another wireless user device (e.g., the NR V2X Rx UE 820). If the wireless user device (e.g., the NR V2X Tx UE 810) is a mode 1 configured wireless user device and the sidelink transmission is performed based on unicast, the wireless user device (e.g., the NR V2X Tx UE 810) may report to a base station 830 for sidelink HARQ-ACK feedback information received from the other wireless user device (e.g., the NR V2X Rx UE 820) through an NR Uu uplink channel. The wireless user device (e.g., the NR V2X Tx UE 810) may need to determine an uplink channel transmission timing of the NR Uu link associated with the sidelink HARQ-ACK feedback information received from the other wireless user device (e.g., the NR V2X Rx UE 820). Hereinafter, a method of configuring a transmission timing is described.

An uplink channel transmission timing of an NR Uu link associated with sidelink HARQ-ACK feedback information may be determined based on sidelink downlink control information (SL DCI) and ACK/NACK window (A/N window).

A wireless user device (e.g., a Tx UE) configured with mode 1 may receive sidelink data scheduling related information and control information from a base station for sidelink unicast data transmission. The base station may transmit SL related control information to the wireless user device (e.g., the Tx UE) through a PDCCH based on an SL DCI format. The SL DCI format may include Uu HARQ timing indication information associated with SL HARQ (SL HARQ (PSFCH) to Uu HARQ timing indication). The wireless user device (e.g., the Tx UE) may be aware of a Uu HARQ timing associated with SL HARQ through the SL DCI. The base station may configure, to the wireless user device (e.g., the Tx UE), A/N window information about Uu HARQ timing indication information associated with SL HARQ (e.g., through RRC signaling) for Uu HARQ timing indication information associated with SL HARQ. The wireless user device (e.g., the Tx UE) may be aware of an uplink channel transmission timing of an NR Uu link associated with SL HARQ-ACK feedback information based on A/N window information configured through RRC and Uu HARQ timing information associated with SL HARQ acquired through the SL DCI.

The A/N window may not correspond to a sidelink resource pool but may correspond to an uplink resource of a Uu link. The A/N window may be configured and apply only in an uplink slot. The A/N window, as a moving window, may be used with a length corresponding to a length of the configured window after a relatively minimum preparation time in a specific PSFCH reception slot.

The A/N window may be configured based on a physical slot or a symbol index regardless of sidelink resources or NR Uu link resources. If the A/N window is configured based on the physical slot or the symbol index regardless of sidelink resources or NR Uu link resources, the wireless user device (e.g., the Tx UE) may transmit SL HARQ feedback information to the base station through the NR Uu link in an uplink slot and/or symbol based on A/N window configuration information and/or signaling.

Figure 9:
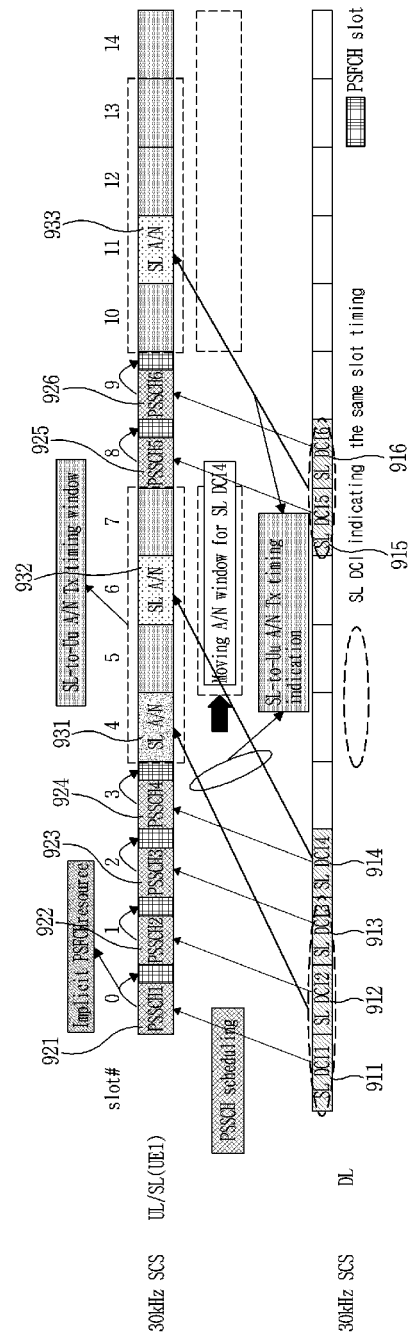
FIG. 9 illustrates an example method for indicating an uplink timing for reporting sidelink HARQ feedback.

Referring to FIG. 9, a wireless user device (e.g., a Tx UE) may transmit each of PSSCHs 921, 922, 923, and 924 to another wireless user device (e.g., the Rx UE) in a corresponding slot based on each corresponding SL DCI 911, 912, 913, 914, respectively. A PSFCH resource may be implicitly indicated based on a PSSCH, and may be configured, as a time resource, per a single slot, two slots, or 4 slots, etc. A frequency resource may be configured based on a starting RB/subchannel of a PSSCH. Although the following configuration is described based on a case in which a PSFCH resource is configured per a slot, aspects are not limited thereto (e.g., a PSFCH resource may be configured per N slots, where N is an integer). One or more configurations described herein may apply regardless of whether PSFCH resources are configured per two slots or 4 slots.

The wireless user device (e.g., the Tx UE) may receive a PSFCH in the same slot 0 corresponding to the PSSCH1 (slot 0) 921. The wireless user device (e.g., the Tx UE) may transmit sidelink HARQ feedback information received from the corresponding PSFCH to a base station through an uplink channel of a Uu channel. The start of possible sidelink A/N window that enables the transmission of the sidelink HARQ feedback to the base station through the uplink channel may be determined by considering a minimum processing time and the like. The A/N window may start from a first uplink slot/symbol in which the uplink channel can be transmitted after considering the minimum processing time and other latencies. A size of the A/N window may be differently configured. The size of the A/N window may be configured by the base station and may be indicated to the wireless user device (e.g., to the Tx UE through RRC). If the size of the A/N window is 4, the A/N window may be configured in four slots (e.g., slots 4 to 7 as shown in FIG. 9). If the size of the A/N window is 8, the A/N window may be configured in eight slots (e.g., slots 4 to 7 and slots 10 to 13 as shown in FIG. 9). The A/N window may be configured using uplink resources of the Uu link instead of using a sidelink resource pool. If the size of the A/N window is configured, the wireless user device (e.g., the Tx UE) may transmit sidelink HARQ information received within the A/N window to the base station. A slot for transmitting the sidelink HARQ information received within the A/N window may be indicated through corresponding SL DCI.

Sidelink HARQ information about the PSSCH1 921 transmitted from the wireless user device (e.g., the Tx UE) in the slot 0 may be received in the slot 0 through the PSFCH. The A/N window for the PSSCH1 921 may be configured from the slot 4 by considering the last OFDM symbol of a PSFCH reception slot, a minimum processing time, and other latencies. The received sidelink HARQ information about the PSSCH1 921 may be transmitted in the slot 4 within the A/N window. A slot for transmitting the received sidelink HARQ information about the PSSCH1 921 may be indicated through the corresponding SL DCI, for example, the SL DCI1 911. Sidelink HARQ information about the PSSCH2 922 transmitted from the wireless user device (e.g., the Tx UE) in the slot 1 may be received in the slot 1. The A/N window for the PSSCH2 922 may be configured from the slot 4 by considering a minimum processing time and other latencies. The received sidelink HARQ information about the PSSCH2 922 may be transmitted in the slot 4 within the A/N window through the PSFCH. A slot for transmitting the received sidelink HARQ information about the PSSCH2 922 may be indicated through corresponding SL DCI, for example, the SL DCI2 912. Sidelink HARQ information about PSSCH3 923 transmitted from the wireless user device (e.g., the Tx UE) in slot 2 may be received in slot 2 through the PSFCH. The A/N window for the PSSCH3 923 may be configured from the slot 4 by considering a minimum processing time and other latencies. The received sidelink HARQ information about the PSSCH3 923 may be transmitted in the slot 4 within the A/N window through the PSFCH. A slot for transmitting the received sidelink HARQ information about the PSSCH3 923 may be indicated through the corresponding SL DCI, for example, the SL DCI3 913.

Sidelink HARQ information about the PSSCH4 924 transmitted from the wireless user device (e.g., the Tx UE) in the slot 4 may be received in the slot 4 through the PSFCH. The A/N window for the PSSCH4 924 may be configured from the slot 5 by considering a minimum processing time and other latencies from a PSFCH reception slot/OFDM symbol including HARQ information. A first slot after the minimum processing time and the other latencies may be the slot 5. For the sidelink HARQ information, the A/N window for the PSSCH4 924 may be configured from the slot 5. If a size of the A/N window is 8, the A/N window may be configured using slots 5 to 7 and slots 10 to 14. The received sidelink HARQ information about the PSSCH4 924 may be transmitted in the slot 6 within the A/N window. A slot for transmitting the received sidelink HARQ information about the PSSCH4 924 may be indicated through corresponding SL DCI, for example, the SL DCI4 914.

A starting point of the A/N window may be determined by considering a processing time (e.g., a time used for PSFCH demodulation and PUCCH/PUSCH transmission preparation) of the wireless user device from the last OFDM symbol of a slot in which the PSFCH is received, a Tx/Rx switching (e.g., SL<->UL) time, an AGC time, and other latencies. The aforementioned time may be a minimum preparation time. The minimum preparation time may be pre-configured or may be configured by the base station. However, aspects are not limited thereto. A single piece of sidelink HARQ information may be transmitted to the base station through the uplink channel by a length of the A/N window from an NR uplink slot (e.g., a sidelink A/N transmittable slot) identical to or earlier than the configured minimum preparation time. NR uplink slot candidates in which SL HARQ can be transmitted may be determined based on at least one of a PSFCH reception slot index, the minimum preparation time, and A/N window configuration. The corresponding A/N window may operate as the moving window. The A/N window may be continuous or discontinues based on configuration. If the A/N window is configured to be continuous, the base station may configure A/N window starting point and length information for the wireless user device (e.g., the Tx UE). If the A/N window is configured to be discontinuous, the base station may configure an A/N window starting point and a relative offset value for the wireless user device (e.g., the Tx UE). The base station may indicate a discontinuous slot. If the A/N window is configured with "{0 (starting slot), 1 (offset), 3 (offset), 7 (offset), 9 (offset)}", the starting slot and slots corresponding to the relative offset may be A/N Tx candidate slots. The offset value may be applied by counting only a UL slot from a starting uplink slot.

The 0 zero value configured among the A/N window configuration values may indicate that a PUCCH transmission and a PSFCH reception are performed in the same slot. The PSFCH reception and the PUCCH transmission may be performed in the same slot.

The sidelink A/N window may be determined using a number of physical slots regardless of downlink/uplink and sidelink, for example, based on the PSFCH reception slot. Unlike one or more examples above, the sidelink A/N window may be determined using a number of physical layers based on the PSFCH reception slot. A downlink slot or a sidelink slot (but not an uplink slot) may be included in the A/N window. The base station may indicate transmission of the sidelink A/N through the uplink slot instead of using the downlink slot and the sidelink slot within the A/N window. SL DCI may indicate a slot for the sidelink A/N transmission as the uplink slot in the A/N window.

A Uu HARQ timing associated with sidelink HARQ report may be indicated through SL DCI, which is described above. Table 13 shows an example of a Uu HARQ timing information field configuration associated with sidelink HARQ within an SL DCI format. A number of bits of a corresponding information field within SL DCI may be determined based on a length of the A/N window configured by the base station or a number of Uu HARQ timing values associated with sidelink HARQ. The range of Uu HARQ timing values associated with the sidelink HARQ may be the range of values configured in the A/N window. Without the aforementioned configuration, a Uu HARQ timing value associated with sidelink HARQ may be possible within the predetermined range of values. The predetermined range of values may be used as $\{1, 2, 3, \ldots, 8\}$. If a Uu HARQ timing value associated with sidelink HARQ is configured (e.g., by RRC signaling), the Uu HARQ timing value associated with the sidelink HARQ may have the wider range. One of 1, 2, and 3 bits in Table 13 may be used in the SL DCI format based on a number of slots (e.g., a number of slots corresponding to an SL HARQ to Uu HARQ timing) within the corresponding predetermined range of values or the range of values configured by RRC signaling. The wireless user device (e.g., the Tx UE) may determine an NR uplink channel transmission timing based on a PSFCH slot in which a timing value indicated by a Uu HARQ timing indication field associated with sidelink HARQ of SL DCI is received from another wireless user device (e.g., the Rx UE).

A specific uplink transmission timing within the A/N window may be configured (e.g., by A/N RRC signaling) or may be performed based on a pre-configured value. However, aspects are not limited thereto. If the aforementioned A/N window configuration information is not provided to the wireless user device, the wireless user device (e.g., the TX UE) may use the pre-configured A/N window configuration as a default value. The default value may include $\{1, 2, 3, 4, 5, 6, 7, 8\}$ or another basic value may be configured.

TABLE 13

| PSFCH-to-HARQ_feedback timing indicator | | | NR Uu slots SL_k |
| --- | --- | --- | --- |
| 1 bit | 2 bits | 3 bits | within a A/N window |
| 0 | 00 | 000 | $1^{st}$ value provided by SL-HARQToUL-ACK |
| 1 | 01 | 001 | $2^{nd}$ value provided by SL-HARQToUL-ACK |
| | 10 | 010 | $3^{rd}$ value provided by SL-HARQToUL-ACK |
| | 11 | 011 | $4^{th}$ value provided by SL-HARQToUL-ACK |
| | | 100 | $5^{th}$ value provided by SL-HARQToUL-ACK |
| | | 101 | $6^{th}$ value provided by SL-HARQToUL-ACK |
| | | 110 | $7^{th}$ value provided by SL-HARQToUL-ACK |
| | | 111 | $8^{th}$ value provided by SL-HARQToUL-ACK |

If the wireless user device (e.g., the Tx UE) performs sidelink data transmission based on Sidelink Semi-Persistent Scheduling (SL SPS) and/or if the wireless user device (e.g., the Tx UE) performs sidelink data transmission configured through RRC signaling, a Uu HARQ timing associated with sidelink HARQ may be determined as described above.

If sidelink transmission is performed based on SL SPS, scheduling may be performed based on SL SPS activation. The wireless user device (e.g., the Tx UE) may activate SL SPS based on an SL DCI format indicating the SL SPS activation. The wireless user device (e.g., the Tx UE) may perform the sidelink transmission through pre-configured resources based on the SL SPS. The Uu HARQ timing associated with sidelink HARQ may also apply even if the sidelink transmission is performed based on the SL SPS. The base station may include information indicating the Uu HARQ timing associated with sidelink HARQ in the SL DCI format activating the SL SPS transmission and may transmit the same to the mode 1 wireless user device (e.g., mode 1 Tx UE) through a PDCCH. The Uu HARQ timing associated with sidelink HARQ may be determined in the aforementioned manner. An uplink slot timing for transmitting sidelink A/N information about a sidelink PSSCH SPS transmission may be indicated through a timing indication field (e.g., "SL A/N to Uu A/N timing indication" information field) within SL DCI indicating SL SPC activation. An uplink slot for sidelink A/N transmission for associated sidelink PSSCH SPS transmission may be determined based on A/N window configuration and indication information within SL DCI for SL SPS activation within the A/N window.

Figure 10:
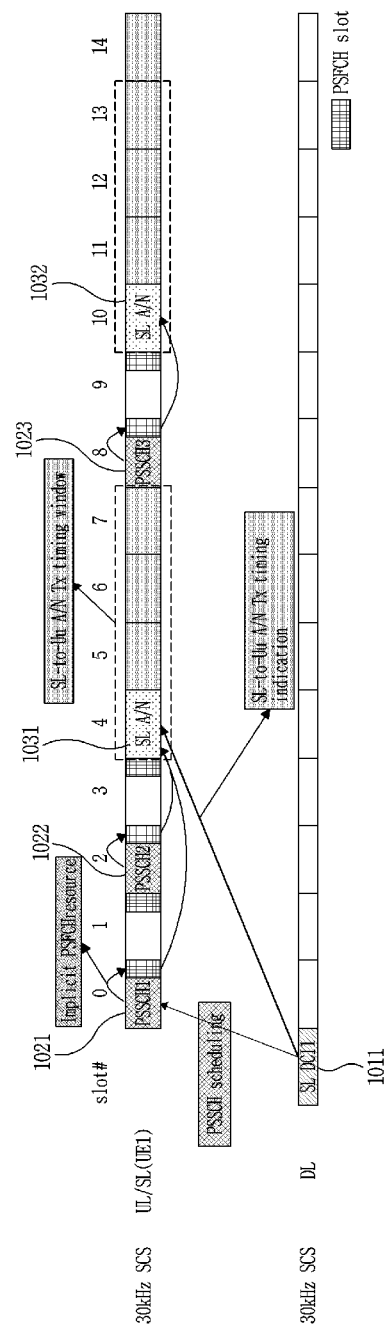
FIG. 10 illustrates an example method for indicating an uplink timing for reporting sidelink HARQ feedback.

Referring to FIG. 10, SL DCI1 1011 may be SL DCI for activating SL SPS. A PSSCH1 1021, a PSSCH2 1022, and a PSSCH3 1023 may be scheduled in an SPS form based on the SL DCI1 1011. A/N window configuration may be indicated through RRC signaling by the base station. A Uu HARQ timing associated with sidelink HARQ may be determined by a Uu HARQ timing indication associated with the sidelink HARQ included in DCI (e.g., SL DCI1 1011) indicating SL SPS activation. Although a size of the A/N window may be configured as 4 in FIG. 10, aspects are not limited thereto. The size of the A/N window may be differently configured and/or determined. The SL DCI1 1011 indicating the SL SPS activation may instruct/cause the wireless user device (e.g., the Tx UE) to report to the base station for sidelink HARQ feedback about the PSSCH1 1021 and sidelink HARQ feedback about the PSSCH2 1022 in a first slot (e.g., slot 4 1031) of the A/N window. The wireless user device (e.g., the Tx UE) may transmit, to the base station, the sidelink HARQ feedback about the PSSCH1 1021 and the sidelink HARQ feedback about the PSSCH2 1022 through an uplink channel of a Uu link in the first slot of the A/N window. The SL DCI1 1011 may instruct/cause the wireless user device (e.g., the Tx UE) to report to the base station for sidelink HARQ feedback about the PSSCH3 1023 through a first slot (e.g., slot 10 1032) within the A/N window after a slot (e.g., a PSFCH reception slot) in which the sidelink HARQ feedback about the PSSCH3 1023 is received. The wireless user device (e.g., the Tx UE) may transmit the sidelink HARQ feedback about the PSSCH3 1023 to the base station through the uplink channel of the Uu link in the first slot (e.g., slot 10 1032) of the A/N window.

The base station may indicate semi-static PSSCH/PSCCH transmission resources of the wireless user device (e.g., the mode 1 Tx UE) through RRC signaling. The base station may not indicate a Uu HARQ timing associated with sidelink HARQ to the wireless user device (e.g., the Tx UE) through SL DCI and may configure the wireless user device (e.g., the Tx UE) to perform Uu HARQ transmission associated with sidelink HARQ in a specific slot within the A/N window through RRC signaling. The base station may instruct/cause the wireless user device (e.g., the Tx UE) to transmit associated sidelink HARQ feedback information in the leftmost slot within the A/N window. Here, the Tx UE may transmit the received sidelink HARQ feedback information to the base station through an uplink channel.

Figure 11:
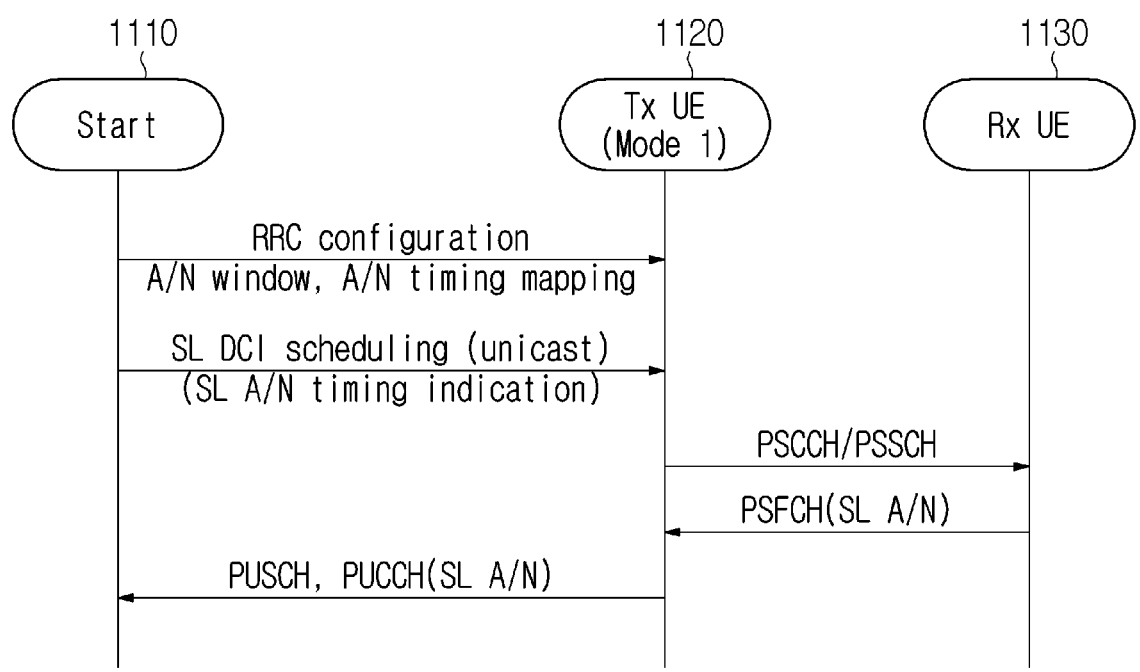
FIG. 11 illustrates an example method for indicating an uplink timing for reporting sidelink HARQ feedback.

FIG. 11 illustrates an example method for performing Uu HARQ transmission associated with sidelink HARQ. Referring to FIG. 11, a base station 1110 may transmit, to the wireless user device (e.g., a TX UE 1120), information required to transmit sidelink HARQ feedback information to a base station through RRC signaling. The wireless user device (e.g., the Tx UE 1120) may verify the information required to transmit sidelink HARQ feedback information to a base station through a pre-configuration. The information required to transmit sidelink HARQ feedback information to a base station may include at least one of: A/N window configuration information, configuration information for sidelink A/N timing indicator field composition within an SL DCI format, and/or PSFCH transmission/reception related configuration information. The wireless user device (e.g., the Tx UE 1120) may monitor a CORESET to determine whether a PDCCH (SL DCI format) including scheduling information for sidelink data transmission (e.g., unicast/groupcast transmission) through a downlink is received from the base station 1110. If the wireless user device (e.g., the Tx UE 1120) detects the PDCCH transmission including the SL DCI format from a downlink slot, the wireless user device (e.g., the Tx UE 1120) may receive PSSCH/PSCCH scheduling information for sidelink data transmission from the SL DCI format. The wireless user device (e.g., the Tx UE 1120) may receive, through the SL DCI format, PUCCH resource indicator information and sidelink HARQ-associated Uu HARQ transmission timing (e.g., SL-to-Uu A/N Tx timing (=PSFCH-to-HARQ_feedback timing indicator)) information for reporting to the base station 1110 for sidelink HARQ feedback information received from another wireless user device (e.g., the Rx UE 1130). If the PSSCH is scheduled based on SL SPS, the wireless user device (e.g., the Tx UE 1120) may receive PUCCH resource indicator information and sidelink HARQ-associated Uu HARQ transmission timing (e.g., SL-to-Uu A/N Tx timing (=PSFCH-to-HARQ_feedback timing indicator)) information through a PDCCH activating SL SPS scheduling (e.g., SL DCI for SL SPS activation). If PSSCH scheduling is configured based on RRC signaling, the wireless user device (e.g., the Tx UE 1120) may configure PUCCH resource indicator information and sidelink HARQ-associated Uu HARQ transmission timing (e.g., SL-to-Uu A/N Tx timing (=PSFCH-to-HARQ_feedback timing indicator) information through RRC signaling. If PSSCH scheduling is configured based on RRC signaling, the wireless user device (e.g., the Tx UE 1120) may pre-configure PUCCH resource indicator information and sidelink HARQ-associated Uu HARQ transmission timing (SL-to-Uu A/N Tx timing (=PSFCH-to-HARQ_feedback timing indicator) information.

The wireless user device (e.g., the Tx UE 1120) may transmit the PSSCH/PSCCH to another wireless user device (e.g., the Rx UE 1130). The wireless user device (e.g., the Tx UE 1120) may receive sidelink HARQ feedback information from the other wireless user device (e.g., the Rx UE 1130) through the PSFCH if a specific time elapses. The wireless user device (e.g., the Tx UE 1120) may transmit sidelink HARQ feedback information received from the other wireless user device (e.g., the Rx UE 1130) via the PSFCH mapped on an uplink channel (e.g., PUCCH or PUSCH), for example, based on an uplink transmission timing indicated by at least one of SL DCI and/or RRC signaling.

Sidelink HARQ feedback information about at least one PSSCH may be multiplexed through the same uplink transmission slot and the same uplink channel. A plurality of pieces of sidelink HARQ feedback information may be multiplexed through the same uplink channel in the same slot. PUCCH transmission resources for transmitting the multiplexed plurality of pieces of sidelink HARQ feedback information may be determined based on a corresponding SL DCI (e.g., recently received sidelink DCI). The PUCCH transmission resources may be determined based on the corresponding SL DCI (e.g., most recent received SL DCI) among a plurality of SL DCI (PDCCH) transmissions for scheduling-associated PSSCH. If a PUCCH transmission resource indicator is absent within SL DCI, a PUCCH transmission resource (e.g., frequency/code resource index) for sidelink HARQ feedback transmission may be configured through RRC signaling. If the PUCCH transmission resource indicator not included in SL DCI, the PUCCH transmission resource (e.g., frequency/code resource index) for sidelink HARQ feedback transmission may be determined by a pre-configuration.

Sidelink V2X may be configured to operate in a plurality of serving cells (multiple carriers). The wireless user device (e.g., the Tx UE 1120) may transmit data to another wireless user device (e.g., the Rx UE 1130) through sidelink using the plurality of serving cells. Sidelink HARQ feedback information may be required per the plurality of serving cells or per each of the plurality of serving cells. If all of a plurality of pieces of sidelink HARQ feedback information are multiplexed on the same uplink serving cell, slot, and uplink channel based on SL DCI that schedules sidelink V2X data transmission on the plurality of serving cells, a PUCCH transmission resource may be determined based on SL DCI corresponding to a largest serving cell index in a most recently received SL DCI slot (e.g., in NR V2X carrier aggregation). If PUCCH transmission resource indicator information is not included in SL DCI, the PUCCH transmission resource for HARQ feedback transmission may be determined through RRC signaling or a pre-configuration.

Figure 12:
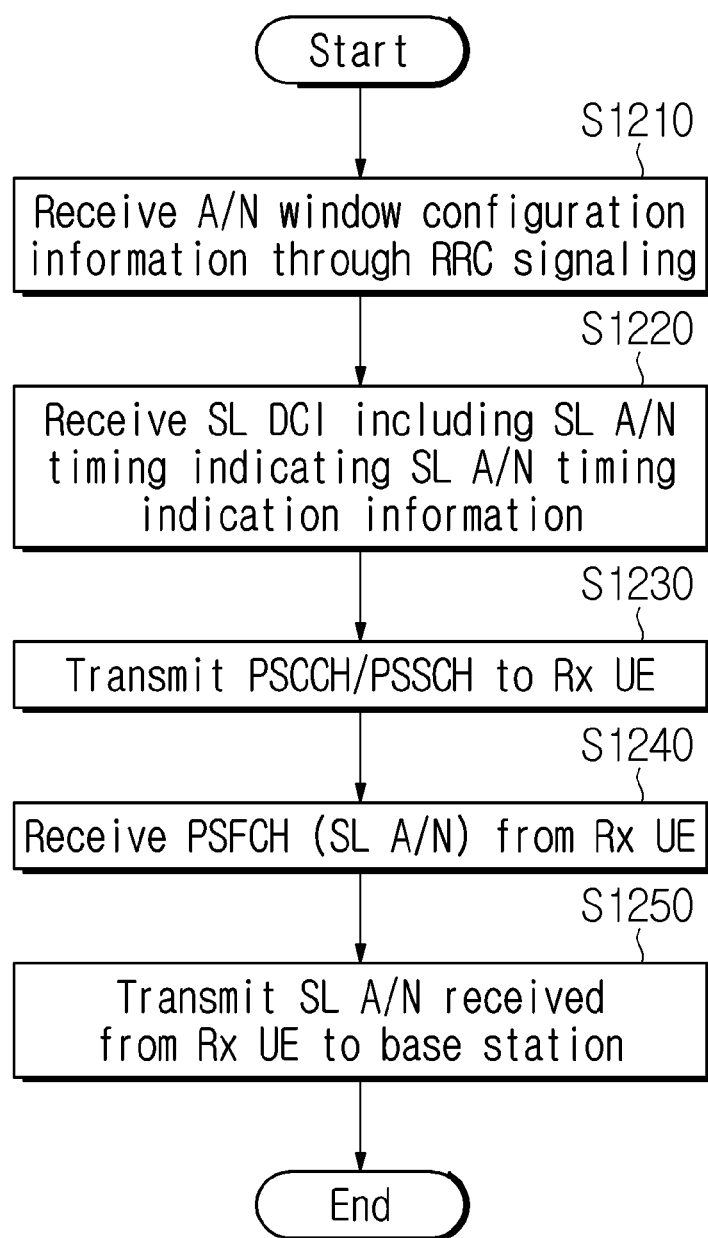
FIG. 12 shows a flowchart illustrating an example method for indicating an uplink timing for reporting sidelink HARQ feedback.

Referring to FIG. 12, if a wireless user device (e.g., a Tx UE) configured with mode 1 performs sidelink transmission based on unicast, the wireless user device (e.g., the Tx UE) may report to a base station for sidelink HARQ feedback received from another wireless user device (e.g., an Rx UE). The wireless user device (e.g., the Tx UE) may receive an A/N window configuration from a base station through RRC signaling (S1210). The wireless user device (e.g., the Tx UE) may receive A/N window configuration information from the base station through RRC signaling. The A/N window may be a candidate resource in which Uu HARQ feedback associated with sidelink HARQ feedback can be transmitted. A size of the A/N window may be differently configured. The A/N window may be a window movable by considering a minimum processing time and other latencies. The wireless user device (e.g., the Tx UE) may receive SL DCI from the base station (S1220). The SL DCI may include information indicating a Uu HARQ feedback transmission timing associated with sidelink HARQ feedback. If the PSSCH is scheduled based on SL SPS, the Uu HARQ feedback transmission timing associated with sidelink HARQ feedback may be indicated by the SL DCI, which is described above. The wireless user device (e.g., the Tx UE) may perform Uu HARQ feedback transmission associated with sidelink HARQ feedback based on a transmission timing indicated by SL DCI within the A/N window. The wireless user device (e.g., the Tx UE) may transmit the PSCCH/PSSCH to another wireless user device (e.g., the Rx UE) (S1230) and may receive PSFCH (sidelink HARQ feedback) in response to the transmitted PSCCH/PSSCH (S1240). The wireless user device (e.g., the Tx UE) may report to the base station for the sidelink HARQ feedback received from another wireless user device (e.g., the Rx UE) (S1250). The wireless user device (e.g., the Tx UE) may report sidelink HARQ feedback to the base station based on the timing indicated within the A/N window, which is described above.

The wireless user device (e.g., the Tx UE) may directly determine a Uu HARQ feedback transmission timing associated with sidelink HARQ feedback based on quality of service (QoS) of sidelink data and the A/N window. The wireless user device (e.g., the Tx UE) may receive sidelink HARQ feedback information from another wireless user device (e.g., the Rx UE). The wireless user device (e.g., the Tx UE) may directly determine a slot timing for reporting to the base station for sidelink HARQ feedback information received through PSFCH demodulation. The wireless user device (e.g., the Tx UE) may directly determine the Uu HARQ feedback transmission timing associated with sidelink HARQ feedback by considering at least one of QoS information of data corresponding to the sidelink HARQ feedback information, the configured A/N window, and a minimum processing time. If the wireless user device (e.g., the Tx UE) reports to the base station for sidelink HARQ feedback corresponding to high QoS sidelink data transmission through an uplink channel of a Uu link, the wireless user device (e.g., the Tx UE) may select a slot value corresponding to an earliest PUCCH transmission timing between RRC signaling and the pre-configured A/N window, and based thereon, the wireless user device (e.g., the Tx UE) may perform Uu HARQ feedback transmission associated with sidelink HARQ feedback. The A/N window may be a PUCCH transmission window. Although the A/N window is used as a term for clarity of description, a PUCCH transmission window or any other terminology may be used to describe the A/N window. The A/N window may indicate a set of PUCCH transmission timing values and may be referred to as another name, without being limited to the aforementioned terminologies. Although the A/N window may be determined as one of values 1 to 8 based on a slot unit, it may be determined as other values. If the wireless user device (e.g., the Tx UE) reports to the base station for sidelink HARQ feedback corresponding to low QoS sidelink data transmission through the uplink channel of the Uu link, the wireless user device (e.g., the Tx UE), the wireless user device (e.g., the Tx UE) may select a value corresponding to a late transmission timing from among timing values within the A/N window. The wireless user device (e.g., the Tx UE) may perform Uu HARQ feedback transmission associated with sidelink HARQ feedback based on the selected transmission timing. A PUCCH transmission slot may be set on a resource configured with an NR uplink slot/OFDM symbol.

Figure 13:
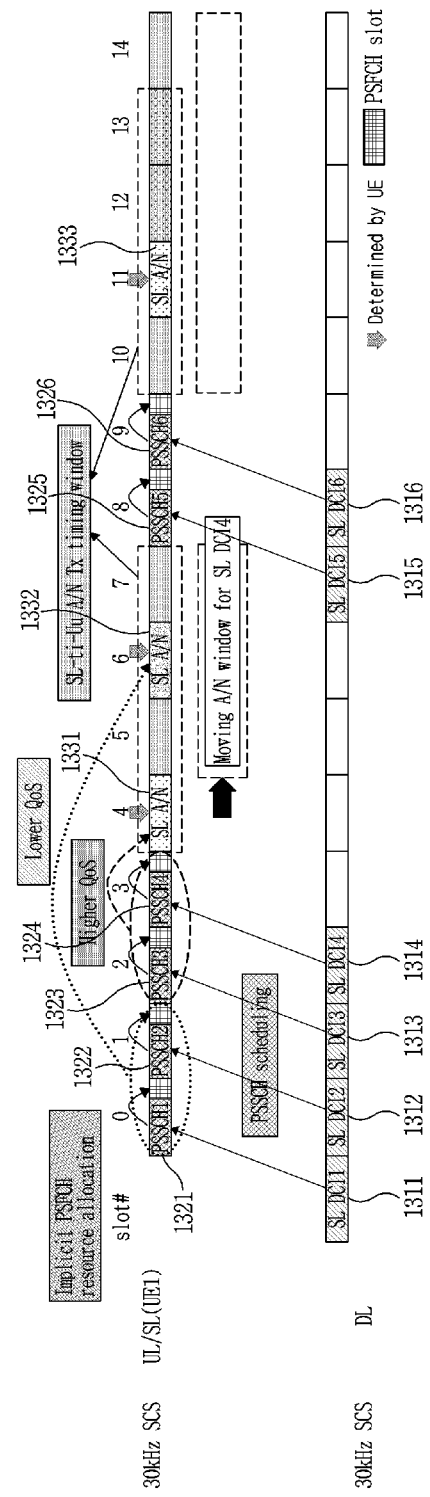
FIG. 13 illustrates an example method for determining an uplink timing for reporting sidelink HARQ feedback.

Referring to FIG. 13, a wireless user device (e.g., a Tx UE) may receive SL DCI 1311, 1312, 1313, and 1314 for sidelink transmission from a base station. The wireless user device (e.g., the Tx UE) may transmit PSSCHs 1321, 1322, 1323, and 1324 in slots corresponding to the SL DCI 1311, 1312, 1313, and 1314, respectively, and may receive sidelink HARQ feedback in response thereto. The wireless user device (e.g., the Tx UE) may be a wireless user device configured with mode 1 and may perform sidelink communication based on unicast. The wireless user device (e.g., the Tx UE) may receive an A/N window configuration from the base station through RRC signaling. The A/N window may be identical to the PUCCH transmission window.

The PSSCH1 1321 and the PSSCH2 1322 may be low QoS required data. The PSSCH3 1323 and the PSSCH4 1324 may be high QoS required data. The wireless user device (e.g., the Tx UE) may receive, from another wireless user device (e.g., the Rx UE), sidelink HARQ feedback information about each of PSSCHs 1321, 1322, 1323, and 1324 through a PSFCH. The wireless user device (e.g., the Tx UE) may report to the base station for each piece of sidelink HARQ feedback information received from the other wireless user device (e.g., the Rx UE). The wireless user device (e.g., the Tx UE) may transmit sidelink HARQ feedback information about the PSSCH3 1323 requiring high QoS in a first slot (e.g., slot 4 1331) within the A/N window. The wireless user device (e.g., the Tx UE) may transmit sidelink HARQ feedback information about the PSSCH4 1324 requiring high QoS in the first slot (e.g., slot 4 1331) within the A/N window. The wireless user device (e.g., the Tx UE) may directly determine a slot for transmitting sidelink HARQ feedback information. The wireless user device (e.g., the Tx UE) may select an earliest slot within the A/N window, for example, because corresponding data requires high QoS and the wireless user device may report the sidelink HARQ feedback information to the base station, and accordingly, may provide a low latency service.

The wireless user device (e.g., the Tx UE) may transmit sidelink HARQ feedback information about the PSSCH1 1321 requiring low QoS in a third slot (e.g., slot 6 1332) within the A/N window. The wireless user device (e.g., the Tx UE) may transmit sidelink HARQ feedback information about the PSSCH2 1322 requiring low QoS in the third slot (e.g., slot 6 1332) within the A/N window. The wireless user device (e.g., the Tx UE) may directly determine a slot for transmitting sidelink HARQ feedback information. Because corresponding data requires low QoS, the wireless user device (e.g., the Tx UE) may select an arbitrary slot from the A/N window and may report the sidelink HARQ feedback information to the base station.

In association with the aforementioned operation, the wireless user device (e.g., the Tx UE) may determine a HARQ transmission timing of Uu associated with sidelink HARQ feedback, for example, by referring to the following Table 14 to Table 16. Table 14 shows PQI (PC5 5QI (5G QoS Identifier)) and QoS mapping information (Standardized PQI to QoS characteristics mapping). "Resource Type", "Default Priority Level", "Packet Delay Budget", "Packet Error Rate", "Default Maximum Data Burst Volume", and "Default Averaging Window" corresponding to PQI may be mapped based on QoS parameter information of NR V2X. A "PUCCH (SL A/N) Tx timing" value may be additionally mapped to PQI information as uplink transmission timing values for sidelink HARQ feedback. A set of PQI and Uu HARQ transmission timing values associated with sidelink HARQ feedback may be mapped based on Table 14. The wireless user device (e.g., the Tx UE) may have the aforementioned values and, based thereon, the wireless user device (e.g., the TX UE) may determine a Uu HARQ timing corresponding to sidelink HARQ. Referring to Table 15, a Uu HARQ timing corresponding to sidelink HARQ may be determined based on a default A/N window. Among PQI values of Table 14, PQI values "55, 82, 83" may have top priority, PQI values "1, 56, 57" may have subsequent priority, and remaining PQI values may have bottom priority. For example, if the A/N window (or PUCCH transmission window) is configured with 1 to 8, Uu HARQ corresponding to sidelink HARQ may be transmitted through "{1, 2, 3}" such that the PQI values "55, 82, 83" having the top priority may be initially transmitted. With respect to the PQI values "1, 56, 57" having the subsequent priority, Uu HARQ corresponding to sidelink HARQ may be transmitted through "{3, 4, 5}". With respect to the other PQI values, Uu HARQ corresponding to sidelink HARQ may be transmitted through a last part "{6, 7, 8}" of the A/N window (or PUCCH transmission window). Table 16 shows an A/N window configured through RRC. For example, if the A/N window is configured through RRC, an A/N window value may be configured with 8 or more, which is described above. The aforementioned timing values within the PUCCH transmission window or the A/N window may be values considering only an NR uplink slot. For example, timing values within the A/N window may represent a physical slot. However, aspects are not limited thereto. For example, a timing indicating a transmission slot of the NR uplink channel for transmitting sidelink HARQ information may be indicated by counting only an NR UL slot.

TABLE 14

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 1 | GBR (NOTE 1) | 3 | 20 ms | 10-4 | N/A | 2000 ms | Platooning between UEs - Higher degree of automation; Platooning between UE and RSU - Higher degree of automation |
| 2 | | 4 | 50 ms | $10^{-2}$ | N/A | 2000 ms | Sensor sharing - higher degree of automation |
| 3 | | 3 | 100 ms | $10^{-4}$ | N/A | 2000 ms | Information sharing for automated driving - between UEs or UE and RSU - higher degree of automation |
| 55 | Non-GBR | 3 | 10 ms | $10^{-4}$ | N/A | N/A | Cooperative lane change - higher degree of automation |
| 56 | | 6 | 20 ms | 10-1 | N/A | N/A | Platooning informative exchange - low degree of automation; Platooning - information sharing with RSU |
| 57 | | 5 | 25 ms | 10-1 | N/A | N/A | Cooperative lane change - lower degree of automation |

TABLE 14-continued

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 58 | | 4 | 100 ms | $10^{-2}$ | N/A | N/A | Sensor information sharing - lower degree of automation |
| 59 | | 6 | 500 ms | $10^{-1}$ | N/A | N/A | Platooning - reporting to an RSU |
| 82 | Delay Critical GBR (NOTE 1) | 3 | 10 ms | $10^{-4}$ | 2000 bytes | 2000 ms | Cooperative collision avoidance; Sensor sharing - Higher degree of automation; Video sharing - higher degree of automation |
| 83 | | 2 | 3 ms | $10^{-5}$ | 2000 byte | 2000 ms | Emergency trajectory alignment; Sensor sharing - Higher degree of automation |

(NOTE 1):
GBR and Delay Critical GBR PQIs can only be used for unicast PC5 communications. GBR and Delay Critical GBR can also be used for broadcast and groupcast.

TABLE 15

| PQI Value | SL HARQ to Uu HARQ timing value |
|---|---|
| 55, 82, 83 | {1, 2, 3} |
| 1, 56, 57, | {3, 4, 5} |
| Others | {6, 7, 8} |

TABLE 16

| PQI Value | SL HARQ to Uu HARQ timing value |
|---|---|
| 55, 82, 83 | {0, 1, 2, 3} |
| 1, 56, 57, | {3, 4, 5, 6, 7, 8} |
| others | {8, 9, 10, 11, 12, 13, 14, 15} |

If the wireless user device (e.g., the Tx UE) reports sidelink HARQ feedback to the base station at a point in time selected within the A/N window based on the aforementioned description, the base station may be unaware of accurate QoS information about sidelink data at a corresponding point in time. If the wireless user device (e.g., the Tx UE) determines a corresponding PUCCH transmission timing, performance reliability of an NR V2X service may be improved. For example, the base station may perform demodulation by blind-monitoring uplink channel resources for transmitting corresponding sidelink HARQ information based on a known A/N window configuration. If the size of the A/N window increases, the base station may need to attempt more blind demodulation. To reduce burden of blind demodulation of the base station, the size of the corresponding A/N window may be adjusted. For example, the A/N window may start from a slot in which the PSFCH is received or from a subsequent slot thereof. The A/N window may end by a slot corresponding to the size of the A/N window. The A/N window may be a moving window. The A/N window may apply from a subsequent slot following a slot (or from the slot in which the PSFCH is received). If 0 is included among timing values within the A/N window, the value 0 may indicate that a PSFCH slot is identical to a PUCCH slot. The corresponding slot may indicate that transmission and reception is performed on different OFDM symbols and the availability thereof may be determined based on a processing time and capability of the wireless user device. If the wireless user device (e.g., the Tx UE) determines an NR PUCCH channel transmission timing for sidelink HARQ transmission on an NR uplink, the wireless user device (e.g., the Tx UE) may select one of values within the A/N window by additionally considering a processing time of the wireless user device (e.g., the Tx UE) and numerology, and the like.

Figure 14:
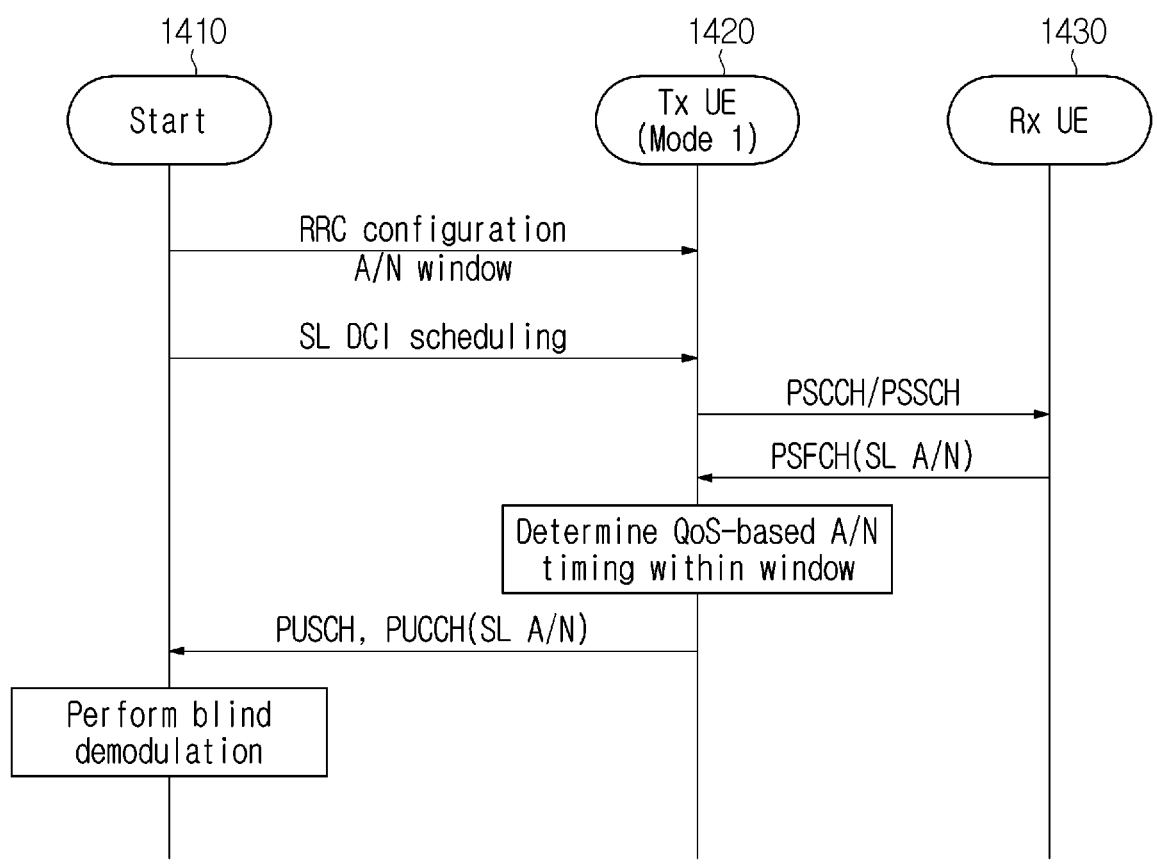
FIG. 14 illustrates an example method for determining an uplink timing for reporting sidelink HARQ feedback.

FIG. 14 illustrates an example method for performing Uu HARQ transmission associated with sidelink HARQ. Referring to FIG. 14, a base station 1410 may transmit, to a wireless user device (e.g., a Tx UE 1420), information required to transmit sidelink HARQ feedback information to a base station (e.g., through RRC signaling). The wireless user device (e.g., the Tx UE 1420) may verify the information required to transmit sidelink HARQ feedback information to a base station (e.g., through a pre-configuration). The information required to transmit sidelink HARQ feedback information to a base station may include at least one of: A/N window configuration information, configuration information for sidelink A/N timing indicator field composition within an SL DCI format, and PSFCH transmission/reception related configuration information. The wireless user device (e.g., the Tx UE 1420) may monitor whether a PDCCH (SL DCI format) including scheduling information for sidelink data transmission (e.g., unicast/groupcast transmission) through a downlink is received from the base station 1410. If the wireless user device (e.g., the Tx UE 1420) detects the PDCCH transmission including the SL DCI format from a downlink slot, the wireless user device (e.g., the Tx UE 1420) may receive PSSCH/PSCCH scheduling information for sidelink data transmission from the SL DCI format. The wireless user device (e.g., the Tx UE 1420) may receive PUCCH resource indicator information through the SL DCI format or through RRC/pre-configuration. If the PSSCH is scheduled based on SL SPS, the wireless user device (e.g., the Tx UE 1420) may receive PUCCH resource indicator information through the PDCCH activating SL SPS scheduling (SL DCI for SL SPS activation). If PSSCH scheduling is configured based on RRC signaling, the wireless user device (e.g., the Tx UE 1420) may configure PUCCH resource indicator information through RRC signaling. If PSSCH scheduling is configured based on RRC signaling, the wireless user device (e.g., the Tx UE 1420) may pre-configure PUCCH resource indicator information.

The wireless user device (e.g., the Tx UE 1420) may transmit the PSSCH/PSCCH to another wireless user device (e.g., the Rx UE 1430). The wireless user device (e.g., the Tx UE 1420) may receive sidelink HARQ feedback information from the other wireless user device (e.g., the Rx UE 1430) through the PSFCH if a specific time elapses. The wireless user device (e.g., the Tx UE 1420) may autonomously determine a Uu HARQ feedback transmission timing associated with sidelink HARQ feedback based on QoS information of data transmitted through the PSSCH associated with the corresponding sidelink feedback transmission. The wireless user device (e.g., the Tx UE 1420) may determine the Uu HARQ feedback transmission timing associated with sidelink HARQ feedback within an A/N window configuration and may transmit the same through an UL channel (e.g., PUCCH or PUSCH) in the determined UL slot.

Sidelink HARQ feedback information about at least one PSSCH may be multiplexed through the same uplink transmission slot and the same uplink channel. A plurality of pieces of sidelink HARQ feedback information may be multiplexed through the same uplink channel in the same slot. PUCCH transmission resources for transmitting the multiplexed plurality of pieces of sidelink HARQ feedback information may be determined based on the most recently received sidelink DCI. The PUCCH transmission resources may be determined based on the most recently received SL DCI among a plurality of pieces of SL DCI (PDCCH) transmissions for scheduling-associated PSSCH. If a PUCCH transmission resource indicator is not included in SL DCI, a PUCCH transmission resources (e.g., frequency/code resource index) for sidelink HARQ feedback transmission may be configured through RRC signaling. If the PUCCH transmission resource indicator is not included in the SL DCI, the PUCCH transmission resources (e.g., frequency/code resource index) for sidelink HARQ feedback transmission may be determined through a pre-configuration.

Sidelink V2X may be configured to operate in a plurality of serving cells (multiple carriers). The wireless user device (e.g., the Tx UE 1420) may transmit data to another wireless user device (e.g., the Rx UE 1430) through the sidelink using the plurality of serving cells. Sidelink HARQ feedback information may be required per the plurality of serving cells. If all of a plurality of pieces of sidelink HARQ feedback information are multiplexed on the same uplink serving cell, slot, and uplink channel based on SL DCI that schedules sidelink V2X data transmission on the plurality of serving cells, a PUCCH transmission resource may be determined based on SL DCI corresponding to a largest serving cell index in the most recently received SL DCI slot (e.g., NR V2X carrier aggregation). If PUCCH transmission resource indicator information is not included in SL DCI, the PUCCH transmission resource for HARQ feedback transmission may be determined through RRC signaling or a pre-configuration.

Figure 15:
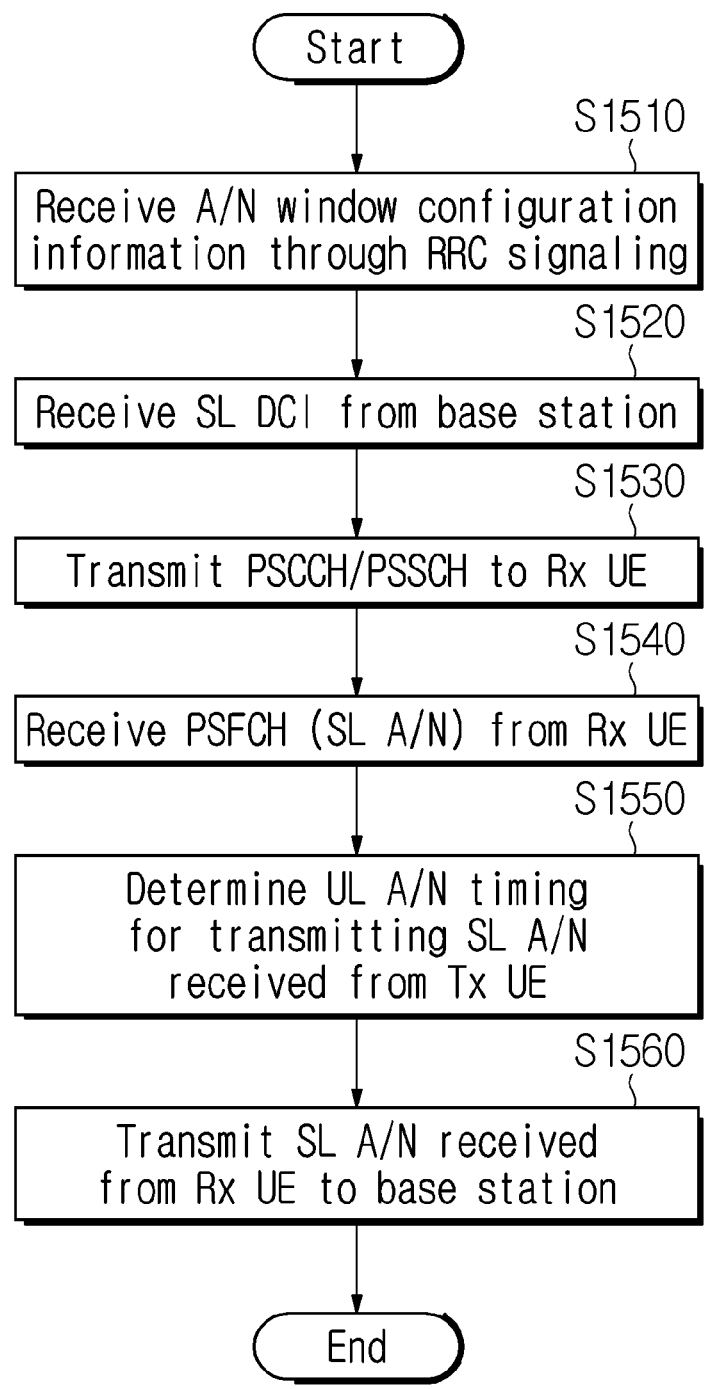
FIG. 15 shows a flowchart illustrating an example method for determining an uplink timing for reporting sidelink HARQ feedback.

Referring to FIG. 15, if a Tx UE configured with mode 1 performs sidelink transmission based on unicast, the wireless user device (e.g., the Tx UE) may report to the base station for sidelink HARQ feedback received from another wireless user device (e.g., an Rx UE). The wireless user device (e.g., the Tx UE) may receive A/N window configuration from a base station through RRC signaling (S1510). The wireless user device (e.g., the Tx UE) may receive A/N window configuration information from the base station through RRC signaling. The A/N window may be a candidate resource in which Uu HARQ feedback associated with sidelink HARQ feedback can be transmitted. A size of the A/N window may be differently configured. The A/N window may be a window movable by considering a minimum processing time and other latencies. The wireless user device (e.g., the Tx UE) may receive SL DCI from the base station (S1520). The wireless user device (e.g., the Tx UE) may receive scheduling information of the PSSCH/PSCCH for sidelink data transmission from the SL DCI format. The wireless user device (e.g., the Tx UE) may receive PUCCH resource indicator information through the SL DCI format. If the PSSCH is scheduled based on SL SPS, the wireless user device (e.g., the Tx UE) may receive PUCCH resource indicator information through the PDCCH activating SL SPS scheduling (e.g., SL DCI for SL SPS activation). If PSSCH scheduling is configured based on RRC signaling, the wireless user device (e.g., the Tx UE) may configure PUCCH resource indicator information through RRC signaling. If PSSCH scheduling is configured based on RRC signaling, the wireless user device (e.g., the Tx UE) may pre-configure PUCCH resource indicator information.

The wireless user device (e.g., the Tx UE) may transmit the PSCCH/PSSCH to another wireless user device (e.g., the Rx UE) (S1530), and, in response thereto, the wireless user device (e.g., the Tx UE) may receive PSFCH (sidelink HARQ feedback) (S1540). The wireless user device (e.g., the Tx UE) may directly determine a timing for reporting to the base station about the sidelink HARQ feedback received from the other wireless user device (e.g., the Rx UE) (S1550). The wireless user device (e.g., the Tx UE) may report the sidelink HARQ feedback to the base station based on the timing directly determined within the A/N window (S1560).

A Uu HARQ feedback transmission timing associated with sidelink HARQ feedback may be semi-statically determined. The Uu HARQ feedback transmission timing associated with sidelink HARQ feedback may be determined based on RRC signaling. The base station may define a PSFCH occasion associated with a single uplink slot and may configure related information for the wireless user device (e.g., the Tx UE). The base station may configure information for the wireless user device (e.g., the Tx UE).

Figure 16:
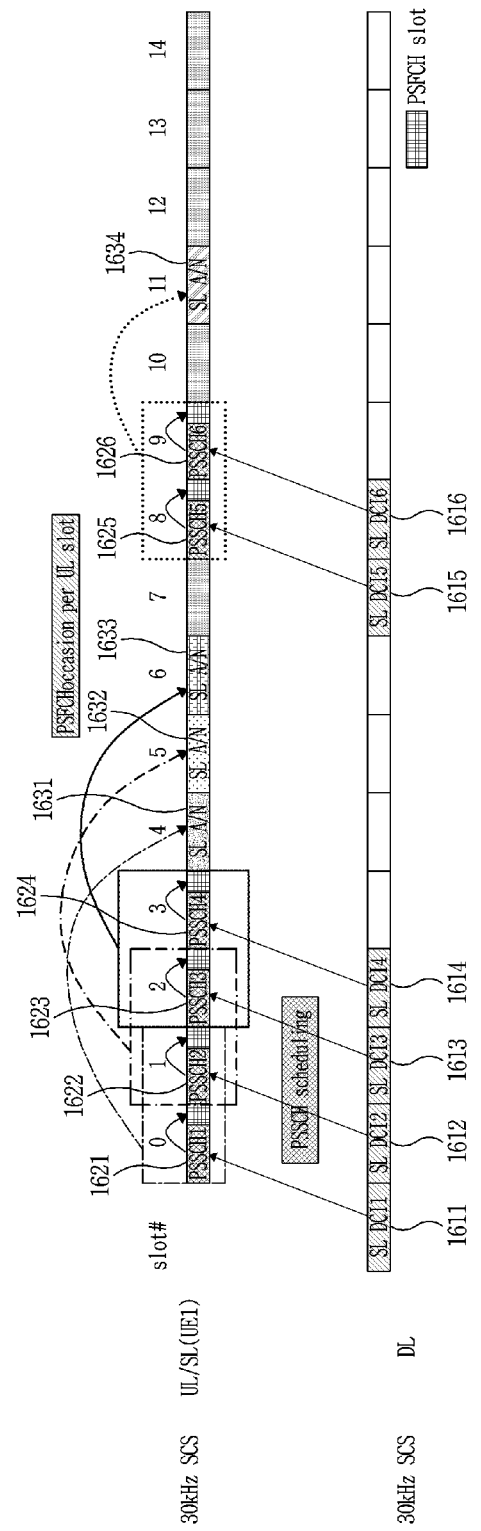
FIG. 16 illustrates an example of a correlation between a PSFCH occasion and an uplink slot for transmitting sidelink HARQ feedback.

Referring to FIG. 16, a wireless user device (e.g., a Tx UE) may receive each of SL DCI 1611, 1612, 1613, and 1614 and may transmit the respective corresponding PSSCHs 1621, 1622, 1623, and 1624 to another wireless user device (e.g., an Rx UE). A PSFCH occasion and a timing for Uu HARQ feedback transmission may be associated with each other. Slot 0 1621 and slot 1 1622 may be associated with slot 4 1631. The wireless user device (e.g., the Tx UE) may report to a base station for sidelink HARQ feedback about the PSSCH1 (slot 0) 1621 and the PSSCH2 (slot 1) 1622 in the slot 4 1631. Slot 1 1622 and slot 2 1623 may be associated with slot 5 1632. The wireless user device (e.g., the Tx UE) may report to the base station for sidelink HARQ feedback about the PSSCH2 (slot 1) 1622 and the PSSCH3 (slot 2) 1623 in the slot 5 1632. Slot 2 1623 and slot 3 1624 may be associated with slot 6 1633. The wireless user device (e.g., the Tx UE) may report to the base station for sidelink HARQ feedback about the PSSCH3 (slot 2) 1623 and the PSSCH4 (slot 3) 1624 in the slot 6 1633.

The relationship between the PSFCH occasion and the uplink slot may be semi-statically pre-configured or may be configured through base station RRC signaling. The wireless user device (e.g., the Tx UE) may determine a number of sidelink HARQ bits and an uplink slot in which the sidelink HARQ bits are to be transmitted based on the configuration. If a corresponding PSFCH occasion is configured through RRC signaling per uplink slot, RRC parameters may be configured (e.g., as shown in the following Table 17). Continuous/discontinuous sidelink slot index or a number of PSFCH slots may be indicated starting from an initial PSFCH occasion per each radio frame as a related PSFCH occasion per an uplink slot (PUCCH/PUSCH).

A configuration parameter (e.g., UL slot index) for a single uplink slot or a plurality of uplink slots associated with the PSFCH occasion may be configured.

TABLE 17

PSFCH occasion per a UL slot (PUCCH/PUSCH):
Continuous or discontinuous PSFCH occasion (SL slot index or number of PSFCH slots) starting from initial PSFCH occasion per radio frame
Configuration parameter (UL slot index) for a single UL slot or a plurality of UL slots associated with the PSFCH occasion If a Uu HARQ feedback transmission timing is semi-statically determined, the wireless user device (e.g., the Tx UE) may receive at least one of: PSFCH transmission/reception related configuration information and PSFCH occasion configuration information per uplink slot required to transmit sidelink HARQ feedback information to the base station through RRC signaling or a pre-configuration. The A/N window may not be configured (e.g., in the above case) and a specific uplink slot for the PSFCH occasion may be determined.

The wireless user device (e.g., the Tx UE) may monitor a PDCCH (SL DCI format) including scheduling information for sidelink data transmission (e.g., unicast/groupcast transmission). If the wireless user device (e.g., the Tx UE) detects the PDCCH transmission including the SL DCI format from downlink slots, the wireless user device (e.g., the Tx UE) may receive PUCCH resource indicator information as well as PSSCH/PSCCH scheduling information for sidelink data transmission from the corresponding SL DCI format. The PUCCH resource indicator may be configured based on RRC/pre-configuration. If PSSCH scheduling is for SL SPS, the wireless user device (e.g., the Tx UE) may receive the aforementioned information through the PDCCH activating SL SPS scheduling (e.g., SL DCI for SL SPS activation).

If PSSCH scheduling is configured based on RRC signaling, at least one of: PSFCH occasion configuration information per uplink slot and PSFCH transmission/reception related configuration information as well as PSSCH/PSCCH scheduling information may be configured based on RRC signaling or pre-configuration information. The wireless user device (e.g., the Tx UE) may receive sidelink HARQ feedback information from another wireless user device (e.g., the Rx UE) through the PSFCH if a specific time elapses after transmitting the PSSCH/PSCCH. The wireless user device (e.g., the Tx UE) may transmit sidelink HARQ feedback information received from the other wireless user device (e.g., the Rx UE) through the uplink channel (e.g., PUCCH or PUSCH) in an uplink slot corresponding to an uplink transmission timing that is determined based on PSFCH occasion configuration information per uplink slot.

Sidelink HARQ feedback information about at least one PSSCH may be multiplexed through the same uplink transmission slot and the same uplink channel. A plurality of pieces of sidelink HARQ feedback information may be multiplexed through the same uplink channel in the same slot. A PUCCH transmission resource for transmitting the multiplexed plurality of pieces of sidelink HARQ feedback information may be determined based on the most recently received sidelink DCI. The PUCCH transmission resource may be determined based on the most recently received SL DCI among a plurality of SL DCI (PDCCH) transmissions for scheduling associated at least one PSSCH. If a PUCCH transmission resource indicator is not included in SL DCI, a PUCCH transmission resource (e.g., frequency/code resource index) for sidelink HARQ feedback transmission may be configured through RRC signaling. If the PUCCH transmission resource indicator is not included in SL DCI, the PUCCH transmission resource (e.g., frequency/code resource index) for the sidelink HARQ feedback transmission may be determined by a pre-configuration.

Sidelink V2X may be configured to operate in a plurality of serving cells (multiple carriers). The wireless user device (e.g., the Tx UE) may transmit data to another wireless user device (e.g., the Rx UE) through the sidelink using the plurality of serving cells. Sidelink HARQ feedback information may be required per the plurality of serving cells. If all of the plurality of pieces of sidelink HARQ feedback information are multiplexed on the same uplink serving cell, slot, and uplink channel based on SL DCI that schedules sidelink V2X data transmission on the plurality of serving cells, a PUCCH transmission resource may be determined based on SL DCI corresponding to a largest serving cell index in the most recently received SL DCI slot (e.g., NR V2X carrier aggregation). If PUCCH transmission resource indicator information is not included in SL DCI, the PUCCH transmission resource for HARQ feedback transmission may be determined through RRC signaling or a pre-configuration.

Figure 17:
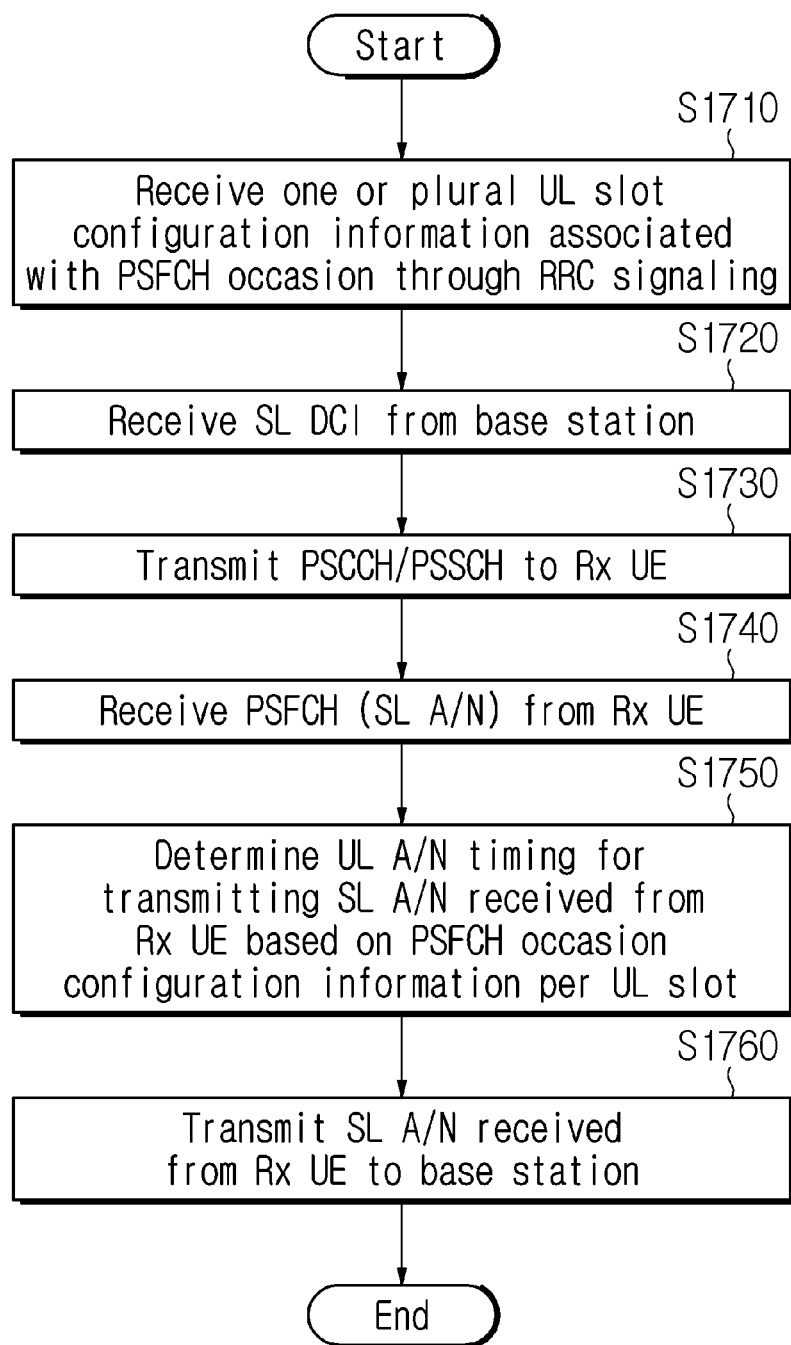
FIG. 17 shows a flowchart illustrating an example of a correlation between a PSFCH occasion and an uplink slot for transmitting sidelink HARQ feedback.

Referring to FIG. 17, if a wireless user device (e.g., a Tx UE) configured with mode 1 performs sidelink transmission based on unicast and HARQ feedback configuration is enabled, the wireless user device (e.g., the Tx UE) may report to a base station for sidelink HARQ feedback from another wireless user device (e.g., an Rx UE). The wireless user device (e.g., the Tx UE) may receive configuration of one or more uplink slots associated with a PSFCH occasion from the base station through RRC signaling (S1710). The wireless user device (e.g., the Tx UE) may receive information about the above information of Table 17 through RRC signaling. The wireless user device (e.g., the Tx UE) may receive SL DCI from a base station (S1720). The wireless user device (e.g., the Tx UE) may receive PSSCH/PSCCH scheduling information for sidelink data transmission from an SL DCI format. The wireless user device (e.g., the Tx UE) may receive PUCCH resource indicator information through the SL DCI format. If PSSCH is scheduled based on SL SPS, the wireless user device (e.g., the Tx UE) may receive PUCCH resource indicator information through the PDCCH activating SL SPS scheduling (e.g., SL DCI for SL SPS activation). If PSSCH scheduling is configured based on RRC signaling, the wireless user device (e.g., the Tx UE) may configure PUCCH resource indicator information through RRC signaling. If PSSCH scheduling is configured based on RRC signaling, the wireless user device (e.g., the Tx UE) may pre-configure PUCCH resource indicator information.

The wireless user device (e.g., the Tx UE) may transmit the PSCCH/PSSCH to another wireless user device (e.g., the Rx UE) (S1730), and, in response thereto, the wireless user device (e.g., the Tx UE) may receive a PSFCH (sidelink HARQ feedback) (S1740). The wireless user device (e.g., the Tx UE) may determine an uplink timing for reporting to the base station for the sidelink HARQ feedback received from the other wireless user device (e.g., the Rx UE) based on PSFCH occasion configuration information per uplink slot (S1750). The wireless user device (e.g., the Tx UE) may report to the base station for Uu HARQ feedback associated with the sidelink HARQ feedback through an uplink slot associated with a slot in which the PSFCH is received based on an PSFCH occasion. The wireless user device (e.g., the Tx UE) may report sidelink HARQ feedback to the base station based on the determined uplink timing (S1760).

PUCCH frequency/code resource configuration for sidelink HARQ feedback transmission may be provided by the base station. The wireless user device (e.g., the Tx UE) may be configured with the PUCCH frequency/code resource configuration based on at least one of RRC signaling and SL DCI. An NR PUCCH resource for configured sidelink HARQ information transmission may be configured independently from a "PUCCH resource" for Uu HARQ transmission corresponding to a PDSCH. If only sidelink HARQ information bits are included in NR PUCCH transmission, the wireless user device (e.g., the Tx UE) may report to the base station for sidelink HARQ information using the independently configured NR PUCCH resource for the sidelink HARQ transmission.

If the size of the A/N window is determined in TDD, the A/N window may not consider a downlink slot and/or OFDM symbol. The A/N window may be configured by considering the uplink slot and/or the OFDM symbol. The wireless user device (e.g., the Tx UE) may transmit sidelink HARQ feedback to the base station using only the uplink slot and/or the OFDM symbol. The A/N window may consider only resources associated with the uplink slot and/or the OFDM symbol. The A/N window may not consider resources corresponding to a sidelink slot and/or an OFDM symbol as well as a downlink slot and/or an OFDM symbol after a slot in which the A/N window starts and may consider only the uplink slot and/or OFDM symbol.

Figure 18:
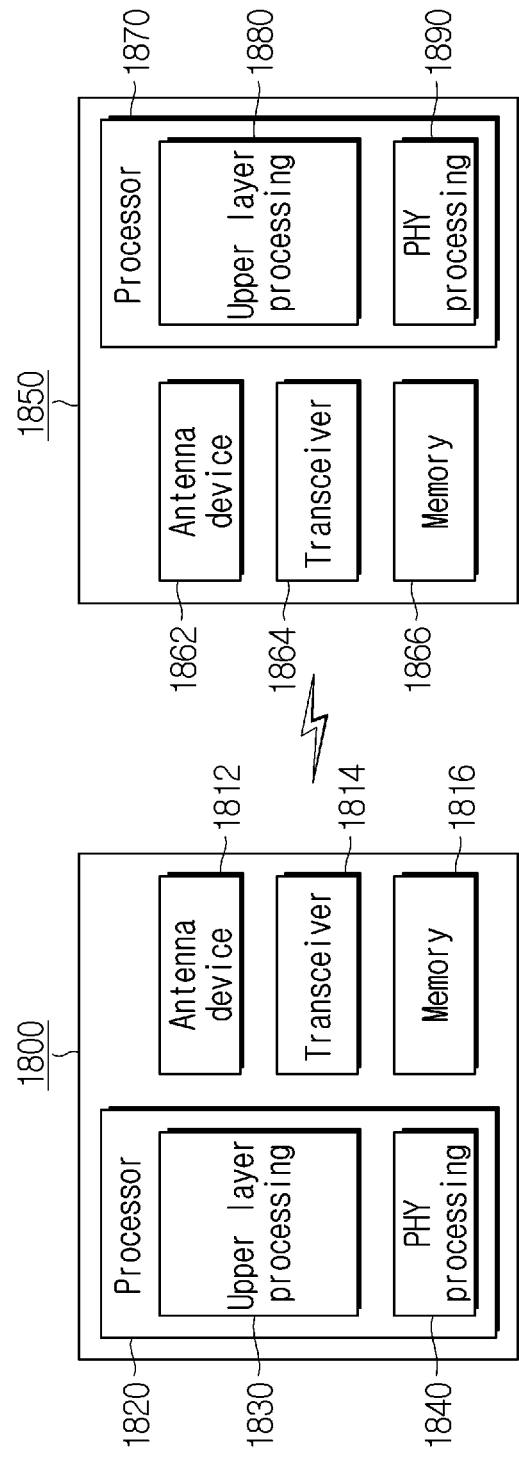
FIG. 18 shows a configuration of a base station device and a terminal device.

FIG. 18 illustrates a base station device and a terminal device (e.g., a wireless user device). Referring to FIG. 18, a base station device 1800 may include a processor 1820, an antenna device 1812, a transceiver 1814, and a memory 1816.

The processor 1820 may perform baseband-related signal processing and may include an upper layer processing 1830 and a physical (PHY) layer processing 1840. The upper layer processing 1830 may process an operation of a Medium Access Control (MAC) layer, a Radio Resource Control (RRC) layer, or more upper layers. The PHY layer processing 1840 may process an operation (e.g., uplink received signal processing and downlink transmission signal processing) of a PHY layer. The processor 1820 may perform the overall operation of the base station device 1800 in addition to performing baseband-related signal processing.

The antenna device 1812 may include at least one PHY antenna. If the antenna device 1812 includes a plurality of antennas, Multiple Input Multiple Output (MIMO) transmission and reception may be supported. The transceiver 1814 may include a radio frequency (RF) transmitter and an RF receiver. The memory 1816 may include operation processed information of the processor 1820, software associated with an operation of the base station device 1800, an operating system (OS), an application, etc., and may include a component, for example, a buffer.

The processor 1820 of the base station device 1800 may be configured to implement an operation of a base station described herein.

The terminal device 1850 may include a processor 1870, an antenna device 1862, a transceiver 1864, and a memory 1866. Communication with the terminal devices 1850 may be performed based on sidelink communication between multiple terminal devices. Each terminal device 1850 performing sidelink communication may refer to a device that performs sidelink communication with another terminal device 1850 in addition to the base station device 1800.

The processor 1870 may perform baseband-related signal processing and may include an upper layer processing 1880 and a PHY layer processing 1890. The upper layer processing 1880 may process an operation of a MAC layer, an RRC layer, or more upper layers. The PHY layer processing 1890 may process an operation (e.g., downlink received signal processing and uplink transmission signal processing) of a PHY layer. The processor 1870 may control the overall operation of the terminal device 1850 in addition to performing baseband-related signal processing.

The antenna device 1862 may include at least one PHY antenna. If the antenna device 1862 includes a plurality of antennas, MIMO transmission and reception may be supported. The transceiver 1864 may include an RF transmitter and an RF receiver. The memory 1866 may store operation processed information of the processor 1870, software associated with an operation of the terminal device 1850, an OS, an application, etc., and may include a component, for example, a buffer.

The processor 1870 of the terminal device 1850 may be configured to implement an operation of a wireless user device described herein.

The processor 1820 of the base station device 1800 may configure information required to transmit sidelink HARQ feedback information to a base station, for example, for the terminal device 1850 through RRC signaling. The processor 1820 of the base station device 1800 may configure an A/N window for the terminal device 1850 (e.g., UE) through RRC signaling. The processor 1820 of the base station device 1800 may indicate configuration information for sidelink A/N timing indicator field configuration within an SL DCI format through RRC signaling. The processor 1820 of the base station device 1800 may indicate configuration information associated with PSFCH transmission/reception through RRC signaling.

The processor 1820 of the base station device 1800 may indicate one or a plurality of uplink slot configuration information associated with a PSFCH occasion to the terminal device 1850 (e.g., UE). Information shown in Table 17 may be communicated between the base station device 1800 and the terminal device 1850. The processor 1820 of the base station device 1800 may transmit SL DCI to the terminal device 1850 (e.g., UE). The SL DCI may include uplink timing information to transmit sidelink HARQ feedback information to the base station device 1800. Uplink timing information used to transmit sidelink HARQ feedback information may be configured within the A/N window. The processor 1820 of the base station device 1800 may transmit SL DCI indicating SLS activation to the terminal device 1850 (e.g., UE). DCI indicating SLS activation may include uplink timing information used to transmit sidelink HARQ feedback information to the base station device 1800. The uplink timing information used to transmit sidelink HARQ feedback information may be configured within the A/N window. SL DCI may include information associated with PSSCH/PSCCH scheduling transmitted from the terminal device 1850 (e.g., UE) to another terminal device 1850 (e.g., another UE) through a sidelink communication, which is described above.

In addition to the feature described above, the base station and the wireless user device may implement one or more features described hereinafter. The base station may transmit, to a first wireless user device, one or more radio resource control (RRC) signals indicating one or more parameters associated with sidelink communication between wireless user devices. The base station may transmit, to the first wireless user device, sidelink downlink control information (SL DCI) comprising a first indicator field that indicates a sidelink hybrid automatic repeat request (HARQ) feedback timing. A bitwidth of the first indicator field may be based on at least one of the one or more parameters. The first wireless user device may transmit, based on the SL DCI and to a second wireless user device, a first sidelink signal (e.g. a PSSCH and/or a PSCCH). The first wireless user device may receive, during a first time interval and from the second wireless user device, first sidelink HARQ feedback information responsive to the first sidelink signal. The first wireless user device may determine, based on the sidelink HARQ feedback timing and based on the first time interval, a second time interval. The first wireless user device may transmit, during the second time interval and to the base station, the first sidelink HARQ feedback information.

The value of the first indicator field may indicate a timing offset between the first time interval and the second time interval. The one or more parameters may indicate information of a time window that comprises the second time interval. The time window may be configured for the first wireless user device to transmit sidelink HARQ feedback information to the base station. The time window may comprise a plurality of discontinuous time intervals, and each of the plurality of discontinuous time intervals may correspond to one or more uplink slots. The first wireless user device may determine, based on the bitwidth and based on the SL DCI, a value of the first indicator field. The first wireless user device may determine, based on the value of the first indicator field, the sidelink HARQ feedback timing. The bitwidth may correspond to 1, 2, or 3. The one or more parameters may indicate one or more timing offset values associated with available timing offsets between the first time interval and the second time interval. The bitwidth may be determined based on a quantity of the one or more timing offset values. The first wireless user device may transmit the first sidelink signal via a PSSCH or a PSCCH. The first time interval may correspond to a physical sidelink feedback channel (PSFCH) reception slot. The second time interval may correspond to an uplink slot or a slot comprising one or more uplink symbols. The first wireless user device may receive, from the base station, second SL DCI comprising a second indicator field that indicates a second sidelink HARQ feedback timing. The first wireless user device may transmit, based on the second SL DCI, a second sidelink signal to a second wireless user device or a third wireless user device. The first wireless user device may receive, during a third time interval, second sidelink HARQ feedback information responsive to the second sidelink signal. The first wireless user device may determine, based on the second sidelink HARQ feedback timing and based on the third time interval, the second time interval to transmit the second sidelink HARQ feedback information. The first wireless user device may transmit, during the second time interval and to the base station, the second sidelink HARQ feedback information. The first sidelink HARQ feedback information and the second sidelink HARQ feedback information may be multiplexed. The first indicator field may indicate a physical sidelink feedback channel (PSFCH) to physical HARQ timing. The one or more parameters may indicate a size of a time window for transmitting sidelink HARQ feedback information to the base station. The SL DCI may indicate a slot, in the time window, for transmitting the first sidelink HARQ feedback information to the base station. The first wireless user device may determine, based on the first indicator field indicating a first value, that the first time interval and the second time interval are in a same slot.

The base station may transmit, to a first wireless user device, one or more parameters associated with sidelink communication between wireless user devices (e.g., information about the time window, etc.). The base station may transmit, to the first wireless user device, sidelink downlink control information (SL DCI) comprising a first indicator field that indicates a sidelink hybrid automatic repeat request (HARQ) feedback timing. After receiving the SL DCI, the first wireless user device may transmit, to a second wireless user device, a first sidelink signal via a physical sidelink shared channel (PSSCH). The first wireless user device may receive, during a first time interval and from the second wireless user device, first sidelink HARQ feedback information responsive to the first sidelink signal. The first wireless user device may determine, based on the sidelink HARQ feedback timing and based on the reception of the first sidelink HARQ feedback information, a second time interval. The first wireless user device may transmit, during the second time interval and to the base station, the first sidelink HARQ feedback information. The first wireless user device may receive the one or more parameters comprises receiving one or more radio resource control (RRC) signals indicating the one or more parameters. A bitwidth of the first indicator field may be based on at least one of the one or more parameters. The first wireless user device may determine the second time interval is based on the first time interval. The first wireless user device may determine, based on at least one of the one or more parameters, a bitwidth of the first indicator field. The first wireless user device may determine, based on the SL DCI and the determined bitwidth of the first indicator field, a value of the first indicator field. The value of the first indicator field may be associated with a quantity of slots between a first slot comprising the first time interval and a second slot comprising the second time interval. The first wireless user device may receive, from the base station, one or more radio resource control (RRC) signals indicating at least one of: one or more semi-static sidelink transmission resources; and/or a slot of a time window for transmitting sidelink HARQ feedback information to the base station. The SL DCI may comprise a physical uplink control channel (PUCCH) resource indicator field indicating one or more uplink resources for transmitting the first sidelink HARQ feedback information to the base station. The one or more parameters may indicate one or more timing offset values associated with available timing offsets between the first time interval and the second time interval. A bitwidth of the first indicator field may be determined based on a quantity of the one or more timing offset values.

This disclosure is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects literally described herein, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
   receiving, by a wireless user device from a base station, one or more radio resource control (RRC) signals indicating one or more parameters associated with sidelink communication between wireless user devices;
   receiving, from the base station, sidelink downlink control information (SL DCI) comprising a first indicator field that indicates a sidelink hybrid automatic repeat request (HARQ) feedback timing, wherein a bitwidth of the first indicator field is based on at least one of the one or more parameters;
   based on the SL DCI, transmitting, to a second wireless user device, a first sidelink signal;
   during a first time interval, receiving, from the second wireless user device, first sidelink HARQ feedback information responsive to the first sidelink signal;
   determining, based on the sidelink HARQ feedback timing and based on the first time interval, a second time interval, wherein the one or more parameters indicates information of a time window that comprises the second time interval, wherein the time window comprises a plurality of discontinuous time intervals, and wherein each of the plurality of discontinuous time intervals corresponds to one or more uplink slots; and
   during the second time interval, transmitting, to the base station, the first sidelink HARQ feedback information.

2. The method of claim 1, wherein a value of the first indicator field indicates a timing offset between the first time interval and the second time interval.

3. The method of claim 1, wherein the time window is configured for the wireless user device to transmit sidelink HARQ feedback information to the base station.

4. The method of claim 1, further comprising:
   determining, based on the bitwidth and based on the SL DCI, a value of the first indicator field,
   wherein determining the sidelink HARQ feedback timing comprises determining, based on the value of the first indicator field, the sidelink HARQ feedback timing.

5. The method of claim 1, wherein the bitwidth corresponds to 1, 2, or 3.

6. The method of claim 1, wherein the one or more parameters indicate one or more timing offset values associated with available timing offsets between the first time interval and the second time interval, and
   wherein the bitwidth is determined based on a quantity of the one or more timing offset values.

7. The method of claim 1, wherein:
   transmitting the first sidelink signal comprises transmitting the first sidelink signal via a physical sidelink shared channel (PSSCH);
   the first time interval corresponds to a physical sidelink feedback channel (PSFCH) reception slot; and
   the second time interval corresponds to an uplink slot or a slot comprising one or more uplink symbols.

8. The method of claim 1, further comprising:
   receiving, from the base station, second SL DCI comprising a second indicator field that indicates a second sidelink HARQ feedback timing;
   based on the second SL DCI, transmitting, to a second wireless user device or a third wireless user device, a second sidelink signal;
   during a third time interval, receiving second sidelink HARQ feedback information responsive to the second sidelink signal;
   determining, based on the second sidelink HARQ feedback timing and based on the third time interval, the second time interval to transmit the second sidelink HARQ feedback information; and
   during the second time interval, transmitting, to the base station, the second sidelink HARQ feedback information.

9. The method of claim 8, wherein the first sidelink HARQ feedback information and the second sidelink HARQ feedback information are multiplexed.

10. The method of claim 1, wherein the first indicator field indicates a physical sidelink feedback channel (PSFCH) to physical HARQ timing.

11. The method of claim 1, wherein the one or more parameters indicates a size of a time window for transmitting sidelink HARQ feedback information to the base station, and
    wherein the SL DCI indicates a slot, in the time window, for transmitting the first sidelink HARQ feedback information to the base station.

12. The method of claim 1, further comprising:
    determining, based on the first indicator field indicating a first value, that the first time interval and the second time interval are in a same slot.

13. A method comprising:
    receiving, by a wireless user device from a base station, one or more parameters associated with sidelink communication between wireless user devices;
    receiving, from the base station, sidelink downlink control information (SL DCI) comprising a first indicator field that indicates a sidelink hybrid automatic repeat request (HARQ) feedback timing;
    after receiving the SL DCI, transmitting, to a second wireless user device, a first sidelink signal via a physical sidelink shared channel (PSSCH);
    during a first time interval, receiving, from the second wireless user device, first sidelink HARQ feedback information responsive to the first sidelink signal;
    determining, based on the sidelink HARQ feedback timing and based on the reception of the first sidelink HARQ feedback information, a second time interval, wherein the one or more parameters indicates information of a time window that comprises the second time interval, wherein the time window comprises a plurality of discontinuous time intervals, and wherein each of the plurality of discontinuous time intervals corresponds to one or more uplink slots; and
    during the second time interval, transmitting, to the base station, the first sidelink HARQ feedback information.

14. The method of claim 13, wherein:
    receiving the one or more parameters comprises receiving one or more radio resource control (RRC) signals indicating the one or more parameters;
    a bitwidth of the first indicator field is based on at least one of the one or more parameters; and
    determining the second time interval is based on the first time interval.

15. The method of claim 13, further comprising:
   determining, based on at least one of the one or more parameters, a bitwidth of the first indicator field; and
   determining, based on the SL DCI and the determined bitwidth of the first indicator field, a value of the first indicator field.

16. The method of claim 15, wherein the value of the first indicator field is associated with a quantity of slots between a first slot comprising the first time interval and a second slot comprising the second time interval.

17. The method of claim 13, further comprising:
   receiving, from the base station, one or more radio resource control (RRC) signals indicating at least one of:
   one or more semi-static sidelink transmission resources; or
   a slot of a time window for transmitting sidelink HARQ feedback information to the base station.

18. The method of claim 13, wherein the SL DCI further comprise a physical uplink control channel (PUCCH) resource indicator field indicating one or more uplink resources for transmitting the first sidelink HARQ feedback information to the base station.

19. The method of claim 13, wherein the one or more parameters indicate one or more timing offset values associated with available timing offsets between the first time interval and the second time interval, and
   wherein a bitwidth of the first indicator field is determined based on a quantity of the one or more timing offset values.

* * * * *